(12) United States Patent
Jeong et al.

(10) Patent No.: US 12,742,914 B2
(45) Date of Patent: Sep. 22, 2026

(54) OPTICAL IMAGING SYSTEM

(71) Applicant: SAMSUNG ELECTRO-MECHANICS CO., LTD, Suwon-si (KR)

(72) Inventors: You Jin Jeong, Suwon-si (KR); So Mi Yang, Suwon-si (KR); Dong Hyuk Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 671 days.

(21) Appl. No.: 17/851,884

(22) Filed: Jun. 28, 2022

(65) Prior Publication Data

US 2023/0176262 A1 Jun. 8, 2023

(30) Foreign Application Priority Data

Dec. 8, 2021 (KR) ........................ 10-2021-0174344

(51) Int. Cl.
*G02B 3/10* (2006.01)
*G02B 3/00* (2006.01)
*G02B 9/62* (2006.01)
*G02B 13/16* (2006.01)

(52) U.S. Cl.
CPC ................. *G02B 3/10* (2013.01); *G02B 9/62* (2013.01); *G02B 13/16* (2013.01); *G02B 2003/0093* (2013.01)

(58) Field of Classification Search
CPC ... G02B 3/10; G02B 9/62; G02B 9/64; G02B 13/16; G02B 13/0045; G02B 13/009; G02B 13/18; G02B 13/00125; G02B 13/0015; G02B 2003/0093; G02B 15/02; G02B 15/146; G02B 27/0172; G02B 27/0012; G02B 27/0025; H04N 5/2254; H04N 5/222
USPC ......... 359/756–762, 749, 713, 708, 656–658
See application file for complete search history.

(56) References Cited

U.S. PATENT DOCUMENTS 3,972,592 A 8/1976 Ruben
12,117,671 B2 * 10/2024 Weng ........................ G02B 9/64
2012/0127589 A1 5/2012 Pao et al.
2013/0314804 A1 * 11/2013 Hirano et al. ......... G02B 5/005 359/757
2015/0138431 A1 * 5/2015 Shin ......................... G02B 9/62 359/757

(Continued)

FOREIGN PATENT DOCUMENTS

CN 104820276 A 8/2015
CN 105629447 A 6/2016

(Continued)

OTHER PUBLICATIONS

CN-113534409-A Translation (Year: 2024).*

(Continued)

*Primary Examiner* — Travis S Fissel
(74) *Attorney, Agent, or Firm* — NSIP Law

(57) ABSTRACT

An optical imaging system including a first lens, a second lens, a third lens, a fourth lens, a fifth lens, and a sixth lens sequentially arranged from an object side toward an imaging plane, wherein an object-side surface of the sixth lens is convex, and wherein one of the first lens to the sixth lens is a variable focus lens configured to have a variable focal length.

19 Claims, 22 Drawing Sheets

(56) References Cited

U.S. PATENT DOCUMENTS

| | | | | |
|---|---|---|---|---|
| 2016/0124187 | A1 | 5/2016 | Chen et al. | |
| 2016/0124189 | A1* | 5/2016 | Park | G02B 13/0045 359/756 |
| 2016/0216484 | A1 | 7/2016 | Chen et al. | |
| 2017/0153449 | A1 | 6/2017 | Mori | |
| 2018/0074296 | A1 | 3/2018 | Lee et al. | |
| 2018/0172956 | A1 | 6/2018 | Son | |
| 2019/0113713 | A1 | 4/2019 | Chen et al. | |
| 2021/0173126 | A1* | 6/2021 | Lee | G02B 9/62 |
| 2022/0043190 | A1 | 2/2022 | Kwon | |
| 2022/0365323 | A1 | 11/2022 | Niu et al. | |
| 2023/0057429 | A1* | 2/2023 | Kwon | G02B 27/646 |

FOREIGN PATENT DOCUMENTS

| | | | |
|---|---|---|---|
| CN | 107219613 | A | 9/2017 |
| CN | 107817594 | A | 3/2018 |
| CN | 108107547 | A | 6/2018 |
| CN | 108205187 | A | 6/2018 |
| CN | 109298508 | A | 2/2019 |
| CN | 111812808 | A | 10/2020 |
| CN | 112285897 | A | 1/2021 |
| CN | 112505884 | A | 3/2021 |
| CN | 112526707 | A | 3/2021 |
| CN | 112835186 | A | 5/2021 |
| CN | 113009669 | A | 6/2021 |
| CN | 113287049 | A | 8/2021 |
| CN | 113296242 | A | 8/2021 |
| CN | 113391429 | A | 9/2021 |
| CN | 113391430 | A | 9/2021 |
| CN | 113534409 | A * | 10/2021 |
| JP | 2010-113064 | A | 5/2010 |
| KR | 10-0835108 | B1 | 6/2008 |
| KR | 10-2020-0085674 | A | 7/2020 |
| KR | 10-2021-0041909 | A | 4/2021 |
| KR | 10-2021-0099915 | A | 8/2021 |
| KR | 10-2021-0099916 | A | 8/2021 |
| TW | 201221994 | A1 | 6/2012 |

OTHER PUBLICATIONS

Chinese Office Action issued on May 29, 2024, in counterpart Chinese Patent Application No. 202211023260.1 (8 pages in English, 13 pages in Chinese).

Chinese Office Action issued on Sep. 4, 2024, in counterpart Chinese Patent Application No. 202211023260.1 (5 pages in English, 9 pages in Chinese).

Taiwanese Office Action issued on Jun. 21, 2023, in counterpart Taiwanese Patent Application No. 111123656 (6 pages in English, 4 pages in Chinese).

Korean Office action issued on May 2, 2024, in counterpart Korean Patent Application No. 10-2021-0174344 (11 pages in English, 9 pages in Korean).

Chinese Office Action issued on Jan. 30, 2024, in counterpart Chinese Patent Application No. 202211023260.1 (4 pages in English, 8 pages in Chinese).

Taiwanese Office Action Issued on Dec. 29, 2025, in Counterpart Taiwanese Patent Application No. 111123656 (14 Pages in English, 10 Pages in Chinese).

* cited by examiner

OPTICAL IMAGING SYSTEM

CROSS-REFERENCE TO RELATED APPLICATIONS

This application claims the benefit under 35 USC 119(a) of Korean Patent Application No. 10-2021-0174344 filed on Dec. 8, 2021, in the Korean Intellectual Property Office, the entire disclosure of which is incorporated herein by reference for all purposes.

BACKGROUND

1. Field

The present disclosure relates to an optical imaging system including a variable focus lens configured to have an adjustable focal length.

2. Description of the Background

A camera module may include an optical imaging system. The optical imaging system of the camera module may have a predetermined focal length. For example, the focal length of the optical imaging system may be determined by lenses constituting the optical imaging system. The camera module may be configured to adjust (autofocus (AF)) the focal length of the optical imaging system for clear image capturing. For example, the camera module may adjust the focal length of the camera module by moving the optical imaging system in an optical axis direction. However, the camera module having the above-described structure may be configured to have a considerable size so as to move the optical imaging system in the optical axis direction, and it may thus be difficult to miniaturize the camera module and to reduce a weight of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially arranged from an object side toward an imaging plane, wherein an object-side surface of the sixth lens is convex, and wherein one of the first lens to the sixth lens is a variable focus lens configured to have a variable focal length.

An image-side surface of the first lens may be convex.

An image-side surface of the second lens may be concave.

The third lens may be configured as the variable focus lens.

An image-side surface of the fourth lens may be convex.

An object-side surface of the fifth lens may be convex.

An image-side surface of the sixth lens may be concave.

SD/TD may be greater than 0.8 in which SD is a distance from a stop to an image-side surface of the sixth lens, and TD is a distance from an object-side surface of the first lens to the image-side surface of the sixth lens.

T1/TTL may be greater than 0.07 and less than 0.20 in which T1 is a thickness of the first lens, and TTL is a distance from an object-side surface of the first lens to the imaging plane.

V1−V2 may be greater than 25 and less than 45 in which V1 is an Abbe number of the first lens, and V2 is an Abbe number of the second lens.

LD/TD may be greater than 0.5 in which LD is a distance from an object-side surface of a variable focus lens to an image-side surface of a sixth lens, and TD is a distance from an object-side surface of the first lens to an image-side surface of the sixth lens.

fv may be greater than −500 mm and less than 50.0 mm in which fv is a focal length of the variable focus lens.

L1S1E/T1 may be less than 2.0 in which L1S1E is an effective diameter of an object-side surface of the first lens, and T1 is a thickness of the first lens.

D12/f may be less than 0.2 in which D12 is a distance from an image-side surface of the first lens to an object-side surface of the second lens, and f is a focal length of the optical imaging system.

L3S1ER may be less than 1.5 mm in which L3S1ER is an effective radius of an object-side surface of the third lens.

An electronic device may include a camera module including the optical imaging system, wherein the optical imaging system may further include an image sensor having a surface on which the imaging plane is formed.

In another general aspect, an optical imaging system includes a first lens having refractive power, a second lens having refractive power, a third lens having refractive power, a fourth lens having a convex object-side surface and a convex image-side surface, a fifth lens having a convex object-side surface, and a sixth lens having refractive power, wherein the first lens to the sixth lens are sequentially arranged from an object-side surface, and wherein $0.001<f1/f6<0.026$ in which f1 is a focal length of the first lens, and f6 is a focal length of the sixth lens.

In another general aspect, an optical imaging system includes a first lens, a second lens, a third lens, a fourth lens, a fifth lens, and a sixth lens sequentially arranged from an object side toward an imaging plane, wherein the third lens is a variable focus lens configured to have a variable focal length, and wherein $0.07<T1/TTL<0.20$ in which T1 is a thickness of the first lens, TTL is a distance from an object-side surface of the first lens to the imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
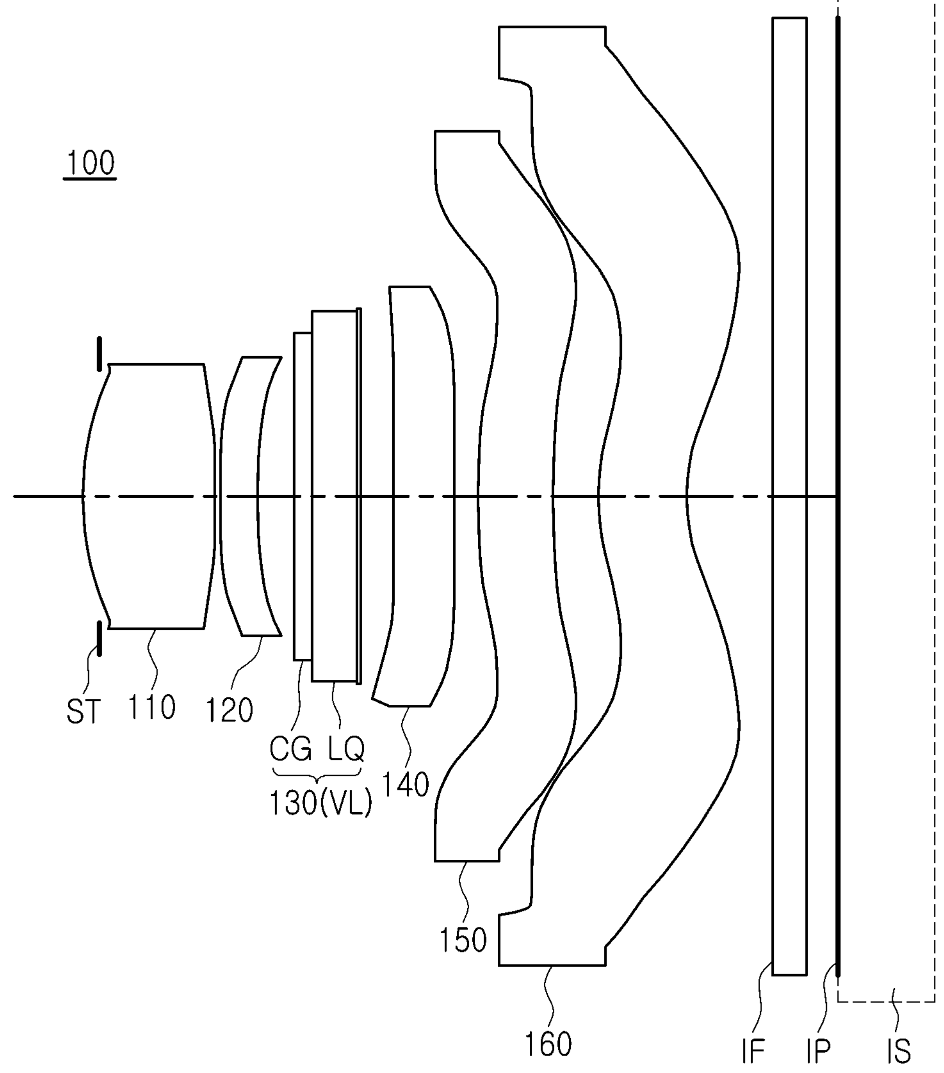
FIG. 1 is a view illustrating an optical imaging system according to a first example embodiment in the present disclosure.

Hereinafter, example embodiments in the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In describing the present disclosure below, terms referring to components of the present disclosure will be used in consideration of functions of respective components, and thus should not be understood as limiting technical components of the present disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide an optical imaging system configured to enable miniaturization and weight reduction of a camera module.

In the present disclosure, a first lens refers to a lens closest to an object (or a subject), while a sixth lens refers to a lens closest to an imaging plane (or an image sensor). In addition, all of radii of curvature and thicknesses of lenses, a TTL (a distance from an object-side surface of the first lens to an imaging plane), an IMGHT (a height of the imaging plane), and focal lengths are represented in millimeters (mm). Thicknesses of the lenses, gaps between the lenses, and the TTL are values calculated on the basis of optical axes of the lenses. In a description of shapes of the lenses, the meaning that one surface of a lens is convex is that an optical axis portion of a corresponding surface is convex, and the meaning that one surface of a lens is concave is that an optical axis portion of a corresponding surface is concave. Therefore, even in the case that it is described that one surface of a lens is convex, an edge portion of the lens may be concave. Likewise, even in the case that it is described that one surface of a lens is concave, an edge portion of the lens may be convex.

An optical imaging system described herein may be configured to be mounted in a mobile electronic device. For example, the optical imaging system may be mounted in a smartphone, a laptop computer, an augmented reality device, a virtual reality device (VR), a portable game machine, or the like. However, an application range and an application example of the optical imaging system described herein are not limited to the above-described electronic device. For example, the optical imaging system may be applied to an electronic device that provides a narrow mounting space, but requires high-resolution image capturing.

An optical imaging system according to a first aspect of the present disclosure may include a plurality of lenses sequentially arranged from an object side. For example, the optical imaging system according to the first aspect may include a first lens, a second lens, a third lens, a fourth lens, a fifth lens, and a sixth lens that are sequentially arranged from the object side toward the imaging plane.

The optical imaging system according to the first aspect may include a variable focus lens configured to have a variable focal length. For example, one of the first to sixth lenses may be a variable focus lens. The variable focus lens may have a focal length within a predetermined range. For example, the variable focus lens may have a focal length of −1100 mm to 60 mm. The variable focus lens may be configured so that the focal length thereof is continuously varied. For example, the variable focus lens may have an arbitrary focal length within the above-described range as a radius of curvature of an image-side surface thereof is arbitrarily varied in the range of 600 mm to −50 mm. As a specific example, the focal length of the variable focus lens may be varied to an arbitrary value within the above-described range, such as −980 mm, −870 mm, 10 mm, or 32 mm.

The optical imaging system according to the first aspect may include a lens of which one surface is convex. For example, the optical imaging system according to the first aspect may include a sixth lens of which an object-side surface is convex.

The optical imaging system according to the first aspect configured as described above may have a plurality of focal lengths through the variable focus lens. For example, a focal length of the optical imaging system may be varied by varying the focal length of the variable focal length lens. As an example, when the variable focus lens has the largest focal length, the optical imaging system may have the largest first focal length. As another example, when the variable focus lens has a normal focal length, the optical imaging system may also have a normal second focal length. As still another example, when the variable focus lens has the smallest focal length, the optical imaging system may have the smallest third focal length. The optical imaging system according to the first aspect may capture images of subjects located at different distances or perform autofocusing (AF) of a camera module, through the first focal length to the third focal length.

The variable focus lens may have a predetermined Abbe number. As an example, the Abbe number of the variable focus lens may be less than 40. As a specific example, the Abbe number of the variable focus lens may be greater than 20 and lower than 40. The variable focus lens may have a predetermined refractive index. As an example, the refractive index of the variable focus lens may be less than 1.6. As a specific example, the refractive index of the variable focus lens may be greater than 1.5 and lower than 1.6.

An optical imaging system according to a second aspect of the present disclosure may include a plurality of lenses sequentially arranged from an object side. For example, the optical imaging system according to the second aspect may include a first lens, a second lens, a third lens, a fourth lens, a fifth lens, and a sixth lens that are sequentially arranged from the object side toward the imaging plane.

The optical imaging system according to the second aspect may include two or more lenses of which at least one surface is convex. For example, the optical imaging system according to the second aspect may include a fourth lens of which an object-side surface is convex and an image-side surface is convex, and a fifth lens of which an object-side surface is convex.

The optical imaging system according to the second aspect may satisfy a predetermined conditional expression. For example, the optical imaging system according to the second aspect may satisfy a conditional expression: $0.001<|f1/f6|<0.026$ in which f1 is a focal length of the first lens and f6 is focal length of the sixth lens.

An optical imaging system according to a third aspect of the present disclosure may be configured to satisfy one or more of the following conditional expressions. As an example, the optical imaging system according to the third aspect may include six lenses, and may satisfy two or more of the following conditional expressions. As another example, the optical imaging system according to the third aspect may include six lenses, and may be configured to satisfy all of the following conditional expressions.

$$0.9<SD/TD$$

$$0.07<T1/TTL<0.20$$

$$25<V1-V2<45$$

$$0.5<LD/TD<0.8$$

$$-500\ mm<fv<50.0\ mm$$

$$L1S1E/T1<2.0$$

$$D12/f<0.2$$

$$L3S1ER<1.5\ mm$$

Here, SD is a distance from a stop to an image-side surface of a sixth lens, TD is a distance from an object-side surface of a first lens to the image-side surface of the sixth lens, T1 is a thickness of the first lens, TTL is a distance from the object-side surface of the first lens to an imaging plane, V1 is an Abbe number of the first lens, V2 is an Abbe number of a second lens, LD is a distance from an object-side surface of a variable focus lens to the image-side surface of the sixth lens, fv is a focal length of the variable focus lens, L1S1E is an effective diameter of the object-side surface of the first lens, D12 is a distance from an image-side surface of the first lens to an object-side surface of the second lens, f is a focal length of the optical imaging system, and L3S1ER is an effective radius of an object-side surface of a third lens.

The optical imaging system may satisfy some of the above-described conditional expressions in a more limited form as follows.

$$1.7<L1S1E/T1<2.0$$

$$0.005<D12/f<0.01$$

$$1.0\ mm<L3S1ER<1.4\ mm$$

An optical imaging system according to a fourth aspect of the present disclosure may be configured to satisfy one or more of the following conditional expressions. As an example, the optical imaging system according to the fourth aspect may include six lenses, and may satisfy two or more of the following conditional expressions. As another example, the optical imaging system according to the fourth aspect may include six lenses, and may be configured to satisfy all of the following conditional expressions.

$$-1.2<f2/f4<-0.4$$

$$0.7<f2/f5<1.2$$

$$-1.2<(R1+R2)/(R1-R2)<-0.4$$

$$0.01<R1/(R9+R10)<0.12$$

$$0.6<R1/(R11+R12)<1.2$$

$$8.0<(R9+R10)/(R11+R12)<12.0$$

$$1.6<R1/R11<2.0$$

Here, f2 is a focal length of a second lens, f4 is a focal length of a fourth lens, f5 is a focal length of a fifth lens, R1 is a radius of curvature of an object-side surface of the first lens, R2 is a radius of curvature of an image-side surface of the first lens, R9 is a radius of curvature of an object-side surface of a fifth lens, R10 is a radius of curvature of an image-side surface of the fifth lens, R11 is a radius of curvature of an object-side surface of a sixth lens, and R12 is a radius of curvature of an image-side surface of the sixth lens.

The optical imaging systems according to the first to fourth aspects may include one or more lenses having the following characteristics, if necessary. As an example, the optical imaging system according to the first aspect may include one of first to sixth lenses according to the following characteristics. As another example, the optical imaging system according to the second aspect may include two or more of first to sixth lenses according to the following characteristics. However, the optical imaging systems according to the above-described aspects do not necessarily include a lens according to the following characteristics.

Characteristics of first to sixth lenses will hereinafter be described.

The first lens may have a predetermined refractive power. For example, the first lens may have positive refractive power. One surface of the first lens may be convex. For example, an image-side surface of the first lens may be convex. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass. The first lens may have a predetermined refractive index. For example, the refractive index of the first lens may be greater than 1.5 and lower than 1.6. The first lens may have a predetermined Abbe number. For example, the Abbe number of the first lens may be greater than 50 and lower than 60.

The second lens may have refractive power. For example, the second lens may have negative refractive power. One surface of the second lens may be concave. For example, an image-side surface of the second lens may be concave. The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass. The second lens may have a predetermined refractive index. For example, the refractive index of the second lens may be greater than 1.6 and lower than 1.7. The second lens may have a predetermined Abbe number. For example, the Abbe number of the second lens may be greater than 18 and lower than 24.

The third lens may have refractive power. For example, the third lens may have positive or negative refractive power. The third lens may be configured to enable autofocusing of the optical imaging system. For example, the third lens may be configured as a variable focus lens having a variable focal length.

The fourth lens may have refractive power. For example, the fourth lens may have positive refractive power. One surface of the fourth lens may be convex. For example, an image-side surface of the fourth lens may be convex. The fourth lens may have an aspherical surface. For example, an object-side surface or the image-side surface of the fourth lens may be aspherical. The fourth lens may be formed of a material having high light transmissivity and excellent workability. For example, the fourth lens may be formed of plastic. However, a material of the fourth lens is not limited to plastic. The fourth lens may have a predetermined refractive index. For example, the refractive index of the fourth lens may be greater than 1.5 and lower than 1.6. The fourth lens may have a predetermined Abbe number. For example, the Abbe number of the fourth lens may be greater than 50 and lower than 60.

The fifth lens may have refractive power. For example, the fifth lens may have negative refractive power. One surface of the fifth lens may be convex. For example, an object-side surface of the fifth lens may be convex. The fifth lens may have an aspherical surface. For example, an object-side surface or an image-side surface of the fifth lens may be aspherical. The fifth lens may include an inflection point. For example, the inflection point may be formed on at least one of the object-side surface and the image-side surface of the fifth lens. The fifth lens may be formed of a material having high light transmissivity and excellent workability. For example, the fifth lens may be formed of plastic. However, a material of the fifth lens is not limited to plastic. The fifth lens may have a predetermined refractive index. For example, the refractive index of the fifth lens may be greater than 1.6 and lower than 1.7. The fifth lens may have a predetermined Abbe number. For example, the Abbe number of the fifth lens may be greater than 18 and lower than 24.

The sixth lens may have refractive power. For example, the sixth lens may have a positive or negative refractive power. One surface of the sixth lens may be convex. For example, an object-side surface of the sixth lens may be convex. The sixth lens may have an aspherical surface. For example, the object-side surface or an image-side surface of the sixth lens may be aspherical. The sixth lens may include an inflection point. For example, an inflection point may be formed on at least one of the object-side surface and the image-side surface of the sixth lens. The sixth lens may be formed of a material having high light transmissivity and excellent workability. For example, the sixth lens may be formed of plastic. However, a material of the sixth lens is not limited to plastic. The sixth lens may have a predetermined refractive index. For example, the refractive index of the sixth lens may be greater than 1.5 and lower than 1.6. The sixth lens may have a predetermined Abbe number. For example, the Abbe number of the sixth lens may be greater than 50 and lower than 60.

The aspherical surfaces of the first to sixth lenses may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{Equation 1}$$

Here, c is an inverse of a radius of curvature of the lens, k is a conic constant, r is a distance from a certain point on an aspherical surface of the lens to an optical axis, A to H, and J are aspherical constants, and Z (or SAG) is a distance between the certain point on the aspherical surface of the lens at the distance r and a tangential plane meeting the apex of the aspherical surface of the lens.

The optical imaging system may further include a cover glass. As an example, the optical imaging system may include a cover glass disposed on an object-side surface or an image-side surface of the variable focus lens. The optical imaging system may further include a filter. The filter may be disposed between the sixth lens and the imaging plane. A filter may be configured to block light of a specific wavelength. For example, the filter may be configured to block infrared rays. The optical imaging system may include the imaging plane. The imaging plane may be formed on a surface of an image sensor or inside the image sensor.

Next, optical imaging systems according to example embodiments are described with reference to the drawings.

An optical imaging system according to a first example embodiment is hereinafter described with reference to FIG. 1.

The optical imaging system 100 according to the first example embodiment may include a plurality of lenses. For example, the optical imaging system 100 may include a first lens 110, a second lens 120, a third lens 130, a fourth lens 140, a fifth lens 150, and a sixth lens 160.

The optical imaging system 100 may include a variable focus lens. For example, one of the first lens 110 to the sixth lens 160 may be a variable focus lens.

The first lens 110 may have positive refractive power, and an object-side surface thereof may be convex while an image-side surface thereof may be convex. The second lens 120 may have negative refractive power, and an object-side surface thereof may be convex while an image-side surface thereof may be concave. The third lens 130 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 140 may have positive refractive power, and an object-side surface thereof may be convex while an image-side surface thereof may be convex. The fifth lens 150 may have negative refractive power, and an object-side surface thereof may be convex while an image-side surface thereof may be concave. The fifth lens 150 may have an inflection point. The sixth lens 160 may have negative refractive power, and an object-side surface thereof may be convex while an image-side surface thereof may be concave. The sixth lens 160 may have an inflection point.

The optical imaging system 100 may include an imaging plane IP In the present example embodiment, the imaging plane IP may be formed on a surface of an image sensor IS. The optical imaging system 100 may include a stop ST. For example, the stop ST may be disposed on the object-side surface of the first lens 110. The optical imaging system 100 may include a filter IF. The filter IF may be disposed between the sixth lens 160 and the imaging plane IP.

Figure 2:
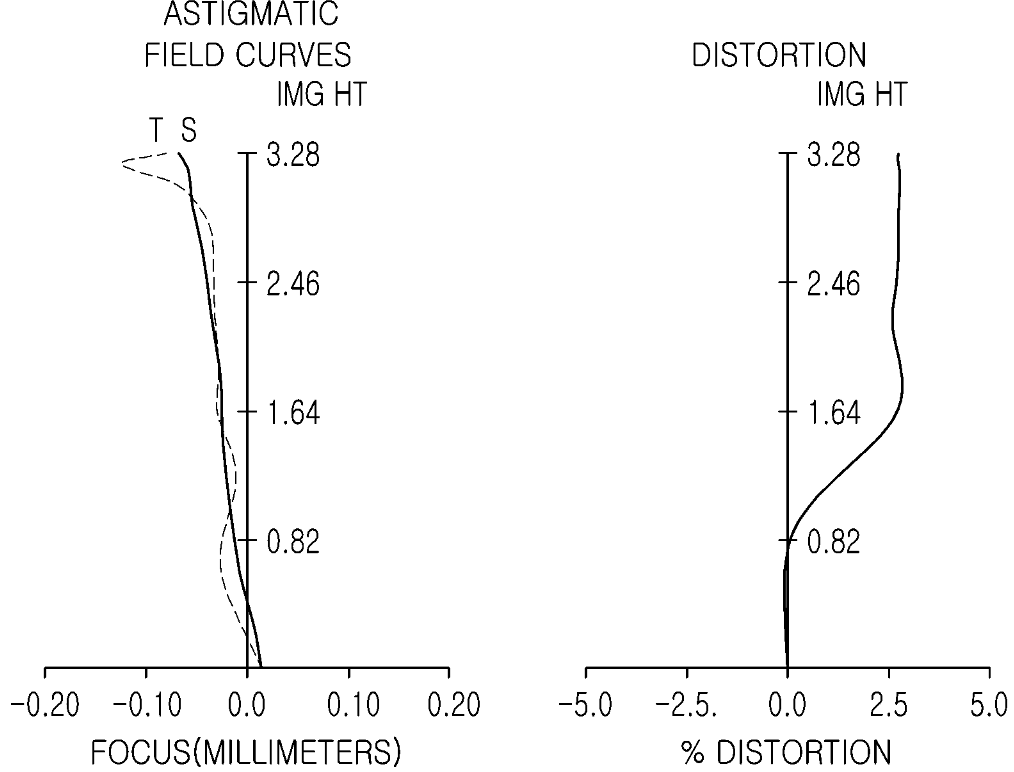
FIG. 2 presents graphs having curves representing aberration characteristics of the optical imaging system illustrated in FIG. 1.

Tables 1 and 2 represent characteristics of lenses and aspherical coefficients of the optical imaging system according to the present example embodiment, respectively, and FIG. 2 presents graphs having curves representing aberration characteristics of the optical imaging system according to the present example embodiment.

TABLE 1

| Surface No. | Component | Radius of Curvature | Thickness/ Distance | Refractive Index | Abbe Number | Effective Radius |
|---|---|---|---|---|---|---|
| S1 | First Lens | 1.7461 | 0.8000 | 1.543 | 56.0 | 0.725 |
| S2 | | −37.0464 | 0.0238 | | | 0.772 |
| S3 | Second Lens | 12.4311 | 0.2300 | 1.657 | 20.4 | 0.797 |
| S4 | | 3.7397 | 0.2237 | | | 0.837 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 58.4652 | 0.3671 | 1.534 | 55.7 | 1.260 |
| S10 | | −9.2419 | 0.1400 | | | 1.432 |
| S11 | Fifth Lens | 14.1905 | 0.4500 | 1.647 | 21.5 | 1.760 |
| S12 | | 4.5126 | 0.2731 | | | 2.180 |
| S13 | Sixth Lens | 1.0064 | 0.5273 | 1.534 | 55.7 | 2.460 |
| S14 | | 0.8104 | 0.5288 | | | 2.780 |
| S15 | Filter | Infinity | 0.2100 | | | |
| S16 | | Infinity | 0.2004 | | | |
| S17 | Imaging Plane | | −0.0142 | | | |

TABLE 2

| Surface No. | S1 | S2 | S3 | S4 | S9 |
|---|---|---|---|---|---|
| K | −4.4324E−01 | 9.9000E+01 | −9.9000E+01 | 9.0145E+00 | 9.9000E+01 |
| A | −3.6340E−02 | −2.4231E−01 | −2.0389E−01 | −1.0594E−01 | 2.5905E−02 |
| B | −1.4126E+00 | −1.5267E+00 | 1.4421E+00 | 3.5022E+00 | −2.7251E−01 |
| C | 6.9935E+01 | 3.9611E+01 | −4.0407E+01 | −5.4949E+01 | 1.2755E+00 |
| D | −1.4017E+03 | −4.7144E+02 | 7.9271E+02 | 5.6219E+02 | −6.8610E+00 |
| E | 1.6495E+04 | 3.7130E+03 | −9.2009E+03 | −3.9369E+03 | 2.9589E+01 |
| F | −1.2738E+05 | −2.1234E+04 | 6.8777E+04 | 1.9602E+04 | −8.3432E+01 |
| G | 6.7928E+05 | 9.2300E+04 | −3.4939E+05 | −7.1001E+04 | 1.5115E+02 |
| H | −2.5647E+06 | −3.0987E+05 | 1.2418E+06 | 1.8911E+05 | −1.7625E+02 |
| J | 6.9138E+06 | 7.9614E+05 | −3.1243E+06 | −3.7023E+05 | 1.2680E+02 |
| L | −1.3227E+07 | −1.5225E+06 | 5.5435E+06 | 5.2632E+05 | −4.5987E+01 |
| M | 1.7541E+07 | 2.0759E+06 | −6.7880E+06 | −5.2830E+05 | −3.2030E+00 |
| N | −1.5333E+07 | −1.8913E+06 | 5.4614E+06 | 3.5472E+05 | 1.0797E+01 |
| O | 7.9447E+06 | 1.0258E+06 | −2.5991E+06 | −1.4285E+05 | −4.2367E+00 |
| P | −1.8482E+06 | −2.4950E+05 | 5.5459E+05 | 2.6070E+04 | 5.7960E−01 |

| Surface No. | S10 | S11 | S12 | S13 | S14 |
|---|---|---|---|---|---|
| K | −5.3006E+01 | 6.0508E+01 | −7.0390E+00 | −2.5565E+00 | −9.6103E−01 |
| A | 2.2552E−01 | 3.1755E−01 | −2.8524E−01 | −7.2886E−01 | −8.3591E−01 |
| B | 4.4258E−01 | 2.5092E−01 | 1.6724E+00 | 1.2687E+00 | 1.1088E+00 |
| C | −6.5908E+00 | −3.2956E+00 | −4.0000E+00 | −1.5483E+00 | −1.2029E+00 |
| D | 2.5873E+01 | 9.3938E+00 | 5.6633E+00 | 1.2315E+00 | 9.6210E−01 |
| E | −6.2403E+01 | −1.6550E+01 | −5.4012E+00 | −6.3044E−01 | −5.6639E−01 |
| F | 1.0713E+02 | 2.0630E+01 | 3.6597E+00 | 1.8061E−01 | 2.4756E−01 |
| G | −1.3745E+02 | −1.8886E+01 | −1.8090E+00 | −4.0425E−03 | −8.1046E−02 |
| H | 1.3318E+02 | 1.2781E+01 | 6.5995E−01 | −1.9833E−02 | 1.9932E−02 |
| J | −9.6641E+01 | −6.3480E+00 | −1.7773E−01 | 8.9985E−03 | −3.6606E−03 |
| L | 5.1435E+01 | 2.2732E+00 | 3.4917E−02 | −2.1660E−03 | 4.9365E−04 |
| M | −1.9398E+01 | −5.6880E−01 | −4.8674E−03 | 3.2396E−04 | −4.7364E−05 |
| N | 4.8912E+00 | 9.4089E−02 | 4.5613E−04 | −3.0211E−05 | 3.0559E−06 |
| O | −7.3779E−01 | −9.2266E−03 | −2.5759E−05 | 1.6168E−06 | −1.1871E−07 |
| P | 5.0255E−02 | 4.0566E−04 | 6.6213E−07 | −3.8058E−08 | 2.0961E−09 |

Figure 3:
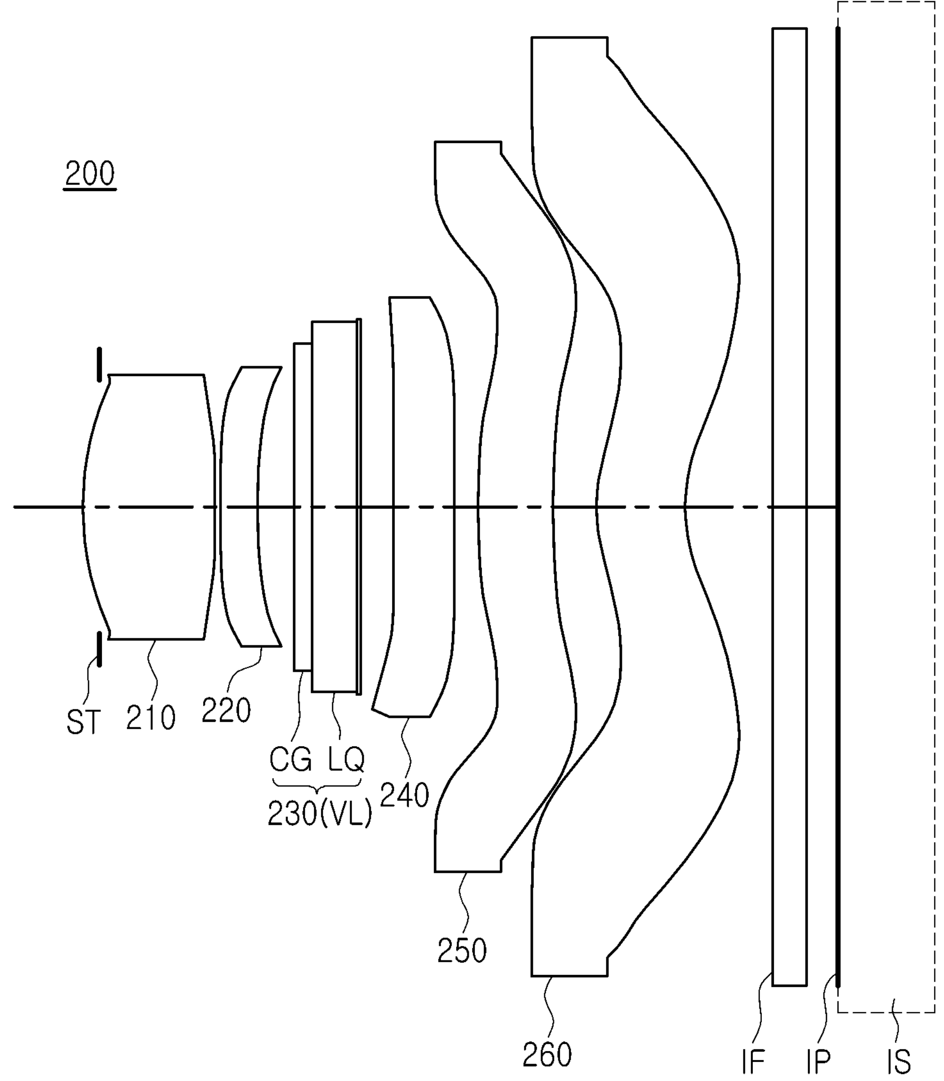
FIG. 3 is a view illustrating an optical imaging system according to a second example embodiment in the present disclosure.

An optical imaging system according to a second example embodiment will be described with reference to FIG. 3.

The optical imaging system 200 according to the second example embodiment may include a plurality of lenses. For example, the optical imaging system 200 may include a first lens 210, a second lens 220, a third lens 230, a fourth lens 240, a fifth lens 250, and a sixth lens 260.

The optical imaging system 200 may include a variable focus lens. For example, one of the first lens 210 to the sixth lens 260 may be a variable focus lens.

The first lens 210 may have positive refractive power, and an object-side surface thereof may be convex while an image-side surface thereof may be convex. The second lens 220 may have negative refractive power, and an object-side surface thereof may be convex while an image-side surface thereof may be concave. The third lens 230 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 240 may have positive refractive power, and an object-side surface thereof may be convex while an image-side surface thereof may be convex. The fifth lens 250 may have negative refractive power, and an object-side surface thereof may be convex while an image-side surface thereof may be concave. The fifth lens 250 may have an inflection point. The sixth lens 260 may have positive refractive power, and an object-side surface thereof may be convex while an image-side surface thereof may be concave. The sixth lens 260 may have an inflection point.

The optical imaging system 200 may include an imaging plane IP In the present example embodiment, the imaging plane IP may be formed on a surface of an image sensor IS. The optical imaging system 200 may include a stop ST. For example, the stop ST may be disposed on the object-side surface of the first lens 210. The optical imaging system 200 may include a filter IF. The filter IF may be disposed between the sixth lens 260 and the imaging plane IP.

Figure 4:
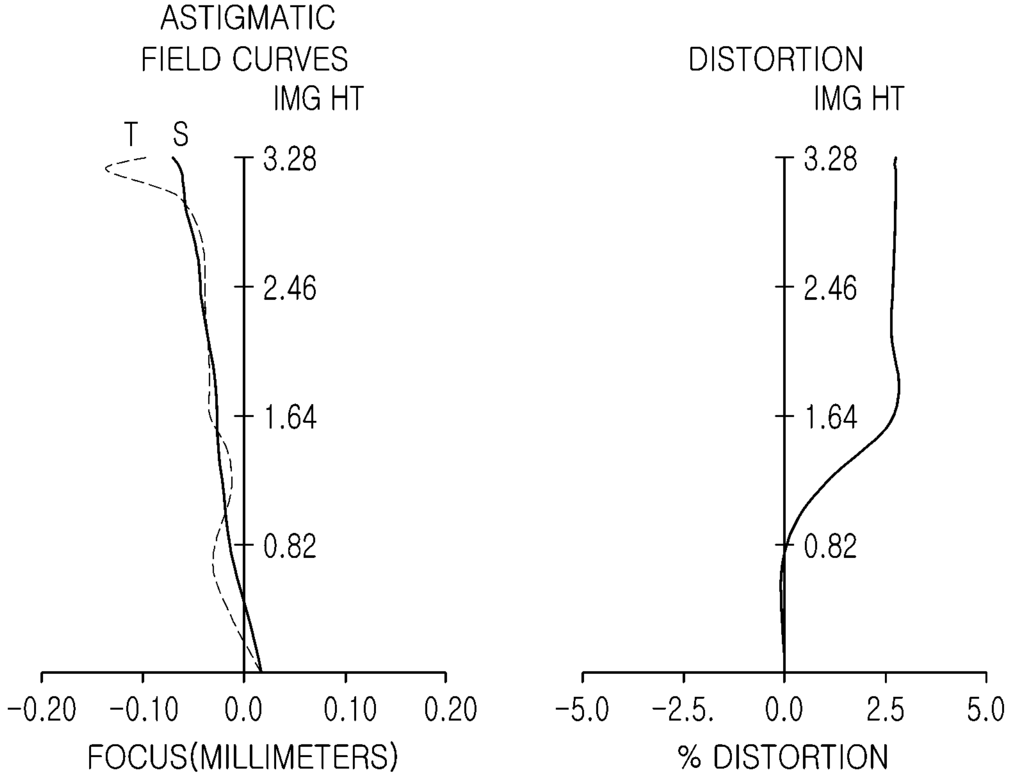
FIG. 4 presents graphs having curves representing aberration characteristics of the optical imaging system illustrated in FIG. 3.

Tables 3 and 4 represent characteristics of lenses and aspherical coefficients of the optical imaging system according to the present example embodiment, respectively, and FIG. 4 presents graphs having curves representing aberration characteristics of the optical imaging system according to the present example embodiment.

TABLE 3

| Surface No. | Component | Radius of Curvature | Thickness/ Distance | Refractive Index | Abbe Number | Effective Radius |
|---|---|---|---|---|---|---|
| S1 | First Lens | 1.7458 | 0.8000 | 1.543 | 56.0 | 0.725 |
| S2 | | −50.5255 | 0.0238 | | | 0.772 |
| S3 | Second Lens | 11.4592 | 0.2300 | 1.657 | 20.4 | 0.798 |
| S4 | | 3.7218 | 0.2244 | | | 0.837 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 57.6929 | 0.3674 | 1.534 | 55.7 | 1.260 |
| S10 | | −9.2481 | 0.1400 | | | 1.432 |
| S11 | Fifth Lens | 14.2607 | 0.4500 | 1.647 | 21.5 | 1.760 |
| S12 | | 4.2986 | 0.2672 | | | 2.180 |
| S13 | Sixth Lens | 0.9949 | 0.5322 | 1.534 | 55.7 | 2.460 |
| S14 | | 0.8126 | 0.5288 | | | 2.780 |
| S15 | Filter | Infinity | 0.2100 | | | |
| S16 | | Infinity | 0.2033 | | | |
| S17 | Imaging Plane | | −0.0171 | | | |

TABLE 4

| Surface No. | S1 | S2 | S3 | S4 | S9 |
|---|---|---|---|---|---|
| K | −4.5052E−01 | 9.9000E+01 | −9.9000E+01 | 9.0139E+00 | 9.9000E+01 |
| A | −4.1776E−02 | −2.6519E−01 | −1.9069E−01 | −1.1172E−01 | 2.0910E−02 |
| B | −1.5395E+00 | −6.0826E−01 | 1.1161E+00 | 3.7605E+00 | −2.1760E−01 |
| C | 7.8909E+01 | 1.7192E+01 | −3.5488E+01 | −5.9815E+01 | 1.1567E+00 |
| D | −1.5931E+03 | −1.5393E+02 | 7.3466E+02 | 6.1656E+02 | −7.5206E+00 |
| E | 1.8767E+04 | 7.8922E+02 | −8.6782E+03 | −4.3331E+03 | 3.4455E+01 |
| F | −1.4474E+05 | −2.5998E+03 | 6.5336E+04 | 2.1573E+04 | −9.7580E+01 |
| G | 7.7010E+05 | 7.2537E+03 | −3.3308E+05 | −7.7860E+04 | 1.7418E+02 |
| H | −2.9002E+06 | −2.7314E+04 | 1.1863E+06 | 2.0591E+05 | −1.9745E+02 |
| J | 7.7992E+06 | 1.1084E+05 | −2.9890E+06 | −3.9898E+05 | 1.3446E+02 |
| L | −1.4887E+07 | −3.2165E+05 | 5.3093E+06 | 5.5976E+05 | −4.0660E+01 |
| M | 1.9704E+07 | 5.9579E+05 | −6.5075E+06 | −5.5314E+05 | −1.1514E+01 |
| N | −1.7195E+07 | −6.7462E+05 | 5.2403E+06 | 3.6488E+05 | 1.5428E+01 |
| O | 8.8975E+06 | 4.2737E+05 | −2.4959E+06 | −1.4412E+05 | −5.5109E+00 |
| P | −2.0677E+06 | −1.1635E+05 | 5.3298E+05 | 2.5761E+04 | 7.2319E−01 |

| Surface No. | S10 | S11 | S12 | S13 | S14 |
|---|---|---|---|---|---|
| K | −6.6948E+01 | 6.0232E+01 | −7.8317E+00 | −2.5742E+00 | −9.6125E−01 |
| A | 2.0117E−01 | 2.9361E−01 | −3.1513E−01 | −7.3728E−01 | −8.2851E−01 |
| B | 7.0064E−01 | 4.8478E−01 | 1.8347E+00 | 1.3438E+00 | 1.1017E+00 |
| C | −7.6739E+00 | −4.2751E+00 | −4.4829E+00 | −1.7680E+00 | −1.2051E+00 |
| D | 2.8145E+01 | 1.1849E+01 | 6.5534E+00 | 1.5908E+00 | 9.6895E−01 |
| E | −6.4260E+01 | −2.0709E+01 | −6.4902E+00 | −9.9818E−01 | −5.6783E−01 |
| F | 1.0490E+02 | 2.5703E+01 | 4.5874E+00 | 4.3151E−01 | 2.4409E−01 |
| G | −1.2909E+02 | −2.3485E+01 | −2.3759E+00 | −1.2275E−01 | −7.7689E−02 |
| H | 1.2150E+02 | 1.5909E+01 | 9.1217E−01 | 1.9976E−02 | 1.8405E−02 |

TABLE 4-continued

| | | | | | |
|---|---|---|---|---|---|
| J | −8.6725E+01 | −7.9341E+00 | −2.5960E−01 | −5.3786E−04 | −3.2359E−03 |
| L | 4.5859E+01 | 2.8618E+00 | 5.4099E−02 | −5.4393E−04 | 4.1651E−04 |
| M | −1.7299E+01 | −7.2332E−01 | −8.0248E−03 | 1.3253E−04 | −3.8133E−05 |
| N | 4.3799E+00 | 1.2116E−01 | 8.0225E−04 | −1.5304E−05 | 2.3521E−06 |
| O | −6.6460E−01 | −1.2059E−02 | −4.8430E−05 | 9.2774E−07 | −8.7658E−08 |
| P | 4.5559E−02 | 5.3907E−04 | 1.3328E−06 | −2.3738E−08 | 1.4919E−09 |

Figure 5:
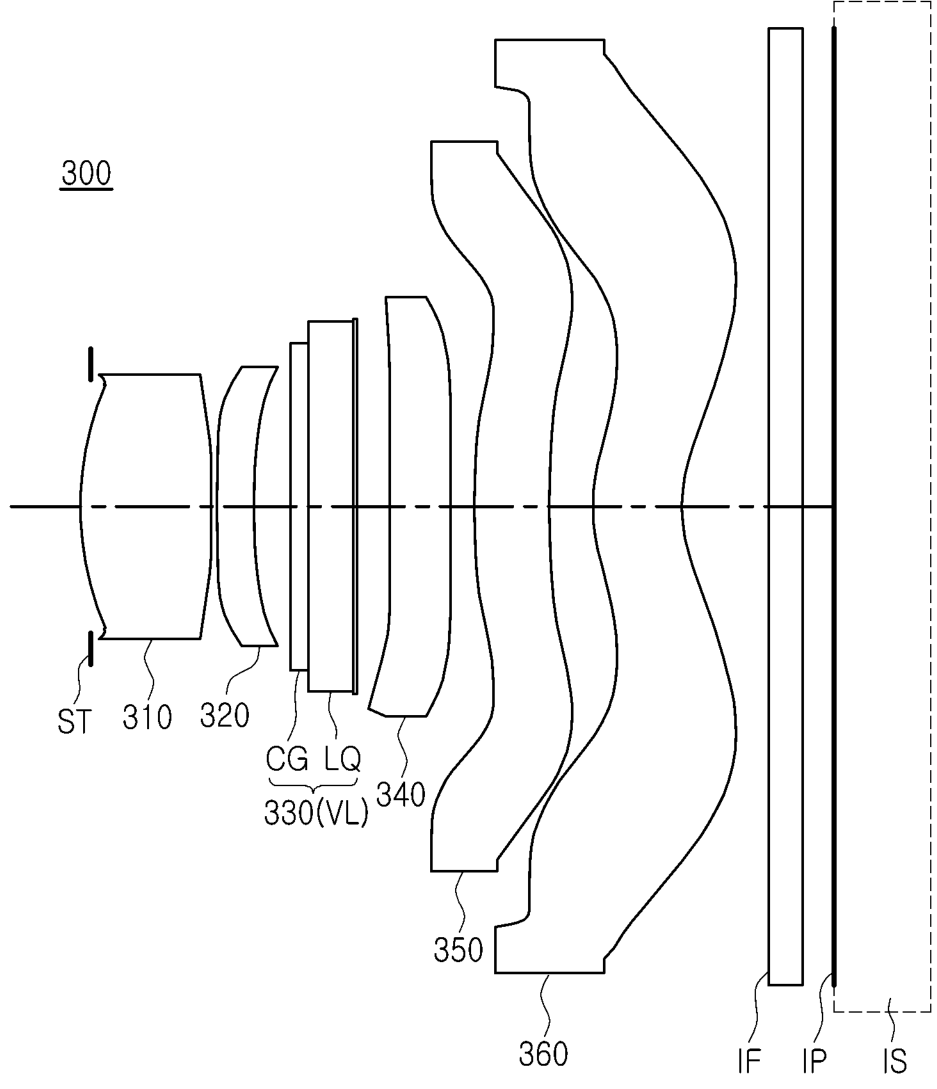
FIG. 5 is a view illustrating an optical imaging system according to a third example embodiment in the present disclosure.

An optical imaging system according to a third example embodiment will be described with reference to FIG. 5.

The optical imaging system 300 according to the third example embodiment may include a plurality of lenses. For example, the optical imaging system 300 may include a first lens 310, a second lens 320, a third lens 330, a fourth lens 340, a fifth lens 350, and a sixth lens 360.

The optical imaging system 300 may include a variable focus lens. For example, one of the first lens 310 to the sixth lens 360 may be a variable focus lens.

The first lens 310 may have positive refractive power, and an object-side surface thereof may be convex while an image-side surface thereof may be convex. The second lens 320 may have negative refractive power, and an object-side surface thereof may be convex while an image-side surface thereof may be concave. The third lens 330 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 340 may have positive refractive power, and an object-side surface thereof may be convex while an image-side surface thereof may be convex. The fifth lens 350 may have negative refractive power, and an object-side surface thereof may be convex while an image-side surface thereof may be concave. The fifth lens 350 may have an inflection point. The sixth lens 360 may have positive refractive power, and an object-side surface thereof may be convex while an image-side surface thereof may be concave. The sixth lens 360 may have an inflection point.

The optical imaging system 300 may include an imaging plane IP In the present example embodiment, the imaging plane IP may be formed on a surface of an image sensor IS. The optical imaging system 300 may include a stop ST. For example, the stop ST may be disposed on the object-side surface of the first lens 310. The optical imaging system 300 may include a filter IF. The filter IF may be disposed between the sixth lens 360 and the imaging plane IP.

Figure 6:
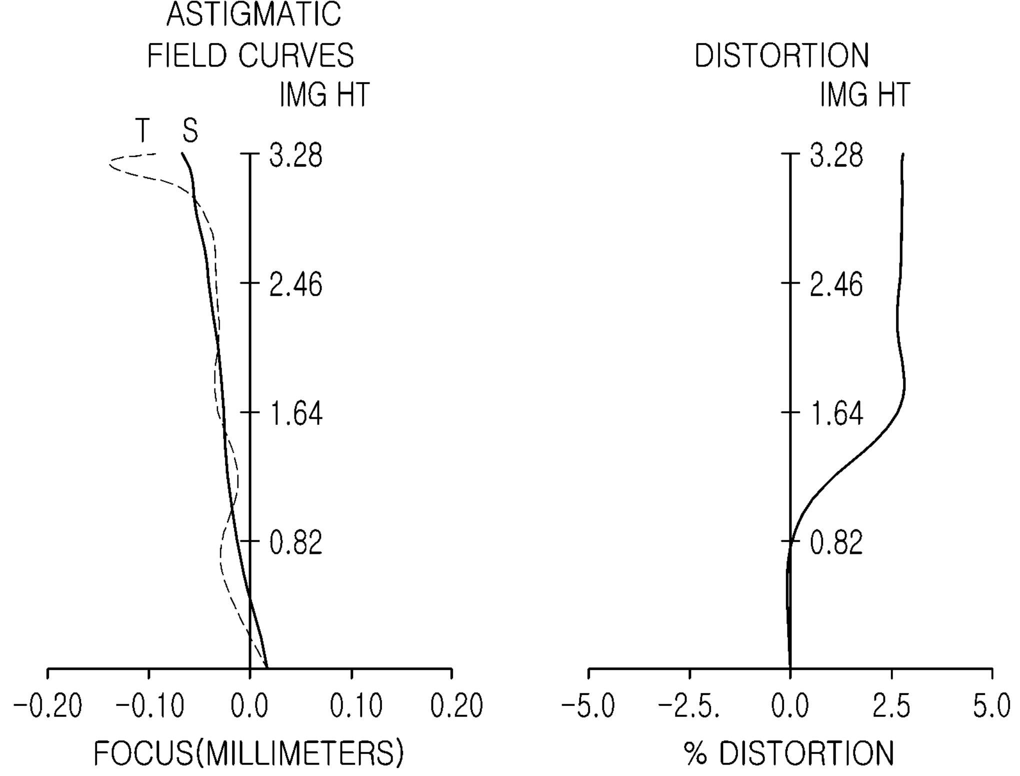
FIG. 6 presents graphs having curves representing aberration characteristics of the optical imaging system illustrated in FIG. 5.

Tables 5 and 6 represent characteristics of lenses and aspherical coefficients of the optical imaging system according to the present example embodiment, respectively, and FIG. 6 presents graphs having curves representing aberration characteristics of the optical imaging system according to the present example embodiment.

TABLE 5

| Surface No. | Component | Radius of Curvature | Thickness/ Distance | Refractive Index | Abbe Number | Effective Radius |
|---|---|---|---|---|---|---|
| S1 | First Lens | 1.7437 | 0.8000 | 1.543 | 56.0 | 0.725 |
| S2 | | −102.4008 | 0.0238 | | | 0.772 |
| S3 | Second Lens | 10.2829 | 0.2300 | 1.667 | 19.2 | 0.798 |
| S4 | | 3.7195 | 0.2217 | | | 0.836 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 59.4471 | 0.3688 | 1.534 | 55.7 | 1.260 |
| S10 | | −9.2225 | 0.1400 | | | 1.432 |
| S11 | Fifth Lens | 14.3214 | 0.4500 | 1.647 | 21.5 | 1.760 |
| S12 | | 4.3088 | 0.2674 | | | 2.180 |
| S13 | Sixth Lens | 0.9944 | 0.5333 | 1.534 | 55.7 | 2.460 |
| S14 | | 0.8118 | 0.5286 | | | 2.780 |
| S15 | Filter | Infinity | 0.2100 | | | |
| S16 | | Infinity | 0.2040 | | | |
| S17 | Imaging Plane | | −0.0176 | | | |

TABLE 6

| Surface No. | S1 | S2 | S3 | S4 | S9 |
|---|---|---|---|---|---|
| K | −4.3852E−01 | 9.9000E+01 | −8.1945E+01 | 8.9767E+00 | 9.9000E+01 |
| A | −3.5617E−02 | −2.5793E−01 | −1.8439E−01 | −1.1568E−01 | 2.9454E−03 |

TABLE 6-continued

| | | | | | |
|---|---|---|---|---|---|
| B | −1.7255E+00 | −9.5577E−01 | 9.7642E−01 | 3.8557E+00 | 6.2932E−02 |
| C | 8.2096E+01 | 2.3033E+01 | −3.3310E+01 | −6.1235E+01 | −1.4242E+00 |
| D | −1.6320E+03 | −2.1567E+02 | 7.0956E+02 | 6.2905E+02 | 7.4182E+00 |
| E | 1.9164E+04 | 1.2357E+03 | −8.4748E+03 | −4.4014E+03 | −2.3086E+01 |
| F | −1.4815E+05 | −4.9321E+03 | 6.4195E+04 | 2.1798E+04 | 5.6011E+01 |
| G | 7.9274E+05 | 1.6490E+04 | −3.2865E+05 | −7.8191E+04 | −1.1754E+02 |
| H | −3.0093E+06 | −5.6058E+04 | 1.1744E+06 | 2.0534E+05 | 2.0254E+02 |
| J | 8.1706E+06 | 1.8190E+05 | −2.9675E+06 | −3.9474E+05 | −2.6268E+02 |
| L | −1.5766E+07 | −4.5810E+05 | 5.2848E+06 | 5.4893E+05 | 2.4225E+02 |
| M | 2.1114E+07 | 7.8907E+05 | −6.4931E+06 | −5.3716E+05 | −1.5250E+02 |
| N | −1.8658E+07 | −8.6141E+05 | 5.2407E+06 | 3.5057E+05 | 6.2102E+01 |
| O | 9.7820E+06 | 5.3592E+05 | −2.5017E+06 | −1.3686E+05 | −1.4734E+01 |
| P | −2.3044E+06 | −1.4473E+05 | 5.3538E+05 | 2.4158E+04 | 1.5465E+00 |

| Surface No. | S10 | S11 | S12 | S13 | S14 |
|---|---|---|---|---|---|
| K | −6.4886E+01 | 6.0458E+01 | −8.0160E+00 | −2.5738E+00 | −9.6133E−01 |
| A | 1.9823E−01 | 2.9754E−01 | −3.1630E−01 | −7.3204E−01 | −8.2226E−01 |
| B | 7.3243E−01 | 4.4039E−01 | 1.8297E+00 | 1.3049E+00 | 1.0655E+00 |
| C | −7.9286E+00 | −4.0448E+00 | −4.4538E+00 | −1.6592E+00 | −1.1217E+00 |
| D | 2.9344E+01 | 1.1116E+01 | 6.5000E+00 | 1.4277E+00 | 8.6214E−01 |
| E | −6.7713E+01 | −1.9116E+01 | −6.4388E+00 | −8.4679E−01 | −4.8070E−01 |
| F | 1.1138E+02 | 2.3254E+01 | 4.5601E+00 | 3.3782E−01 | 1.9561E−01 |
| G | −1.3738E+02 | −2.0792E+01 | −2.3698E+00 | −8.2491E−02 | −5.8632E−02 |
| H | 1.2885E+02 | 1.3783E+01 | 9.1393E−01 | 7.7137E−03 | 1.3022E−02 |
| J | −9.1255E+01 | −6.7315E+00 | −2.6144E−01 | 2.1239E−03 | −2.1396E−03 |
| L | 4.7770E+01 | 2.3801E+00 | 5.4772E−02 | −9.5203E−04 | 2.5705E−04 |
| M | −1.7827E+01 | −5.9027E−01 | −8.1658E−03 | 1.7556E−04 | −2.1984E−05 |
| N | 4.4668E+00 | 9.7096E−02 | 8.1997E−04 | −1.8257E−05 | 1.2709E−06 |
| O | −6.7125E−01 | −9.4950E−03 | −4.9677E−05 | 1.0457E−06 | −4.4649E−08 |
| P | 4.5612E−02 | 4.1727E−04 | 1.3706E−06 | −2.5794E−08 | 7.2246E−10 |

Figure 7:
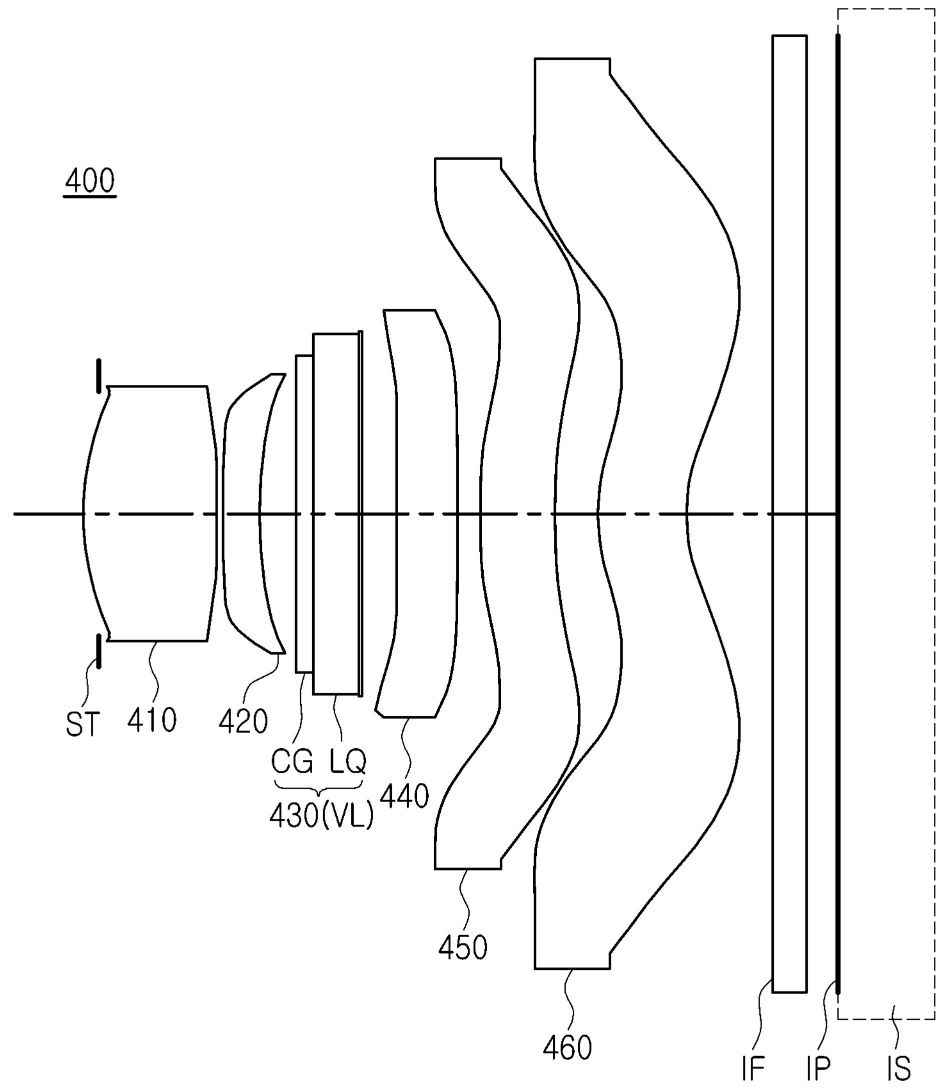
FIG. 7 is a view illustrating an optical imaging system according to a fourth example embodiment in the present disclosure.

An optical imaging system according to a fourth example embodiment will be described with reference to FIG. 7.

The optical imaging system 400 according to the fourth example embodiment may include a plurality of lenses. For example, the optical imaging system 400 may include a first lens 410, a second lens 420, a third lens 430, a fourth lens 440, a fifth lens 450, and a sixth lens 460.

The optical imaging system 400 may include a variable focus lens. For example, one of the first lens 410 to the sixth lens 460 may be a variable focus lens.

The first lens 410 may have positive refractive power, and an object-side surface thereof may be convex while an image-side surface thereof may be concave. The second lens 420 may have negative refractive power, and an object-side surface thereof may be convex while an image-side surface thereof may be concave. The third lens 430 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 440 may have positive refractive power, and an object-side surface thereof may be convex while an image-side surface thereof may be convex. The fifth lens 450 may have negative refractive power, and an object-side surface thereof may be convex while an image-side surface thereof may be concave. The fifth lens 450 may have an inflection point. The sixth lens 460 may have positive refractive power, and an object-side surface thereof may be convex while an image-side surface thereof may be concave. The sixth lens 460 may have an inflection point.

The optical imaging system 400 may include an imaging plane IP In the present example embodiment, the imaging plane IP may be formed on a surface of an image sensor IS. The optical imaging system 400 may include a stop ST. For example, the stop ST may be disposed on the object-side surface of the first lens 410. The optical imaging system 400 may include a filter IF. The filter IF may be disposed between the sixth lens 460 and the imaging plane IP.

Figure 8:
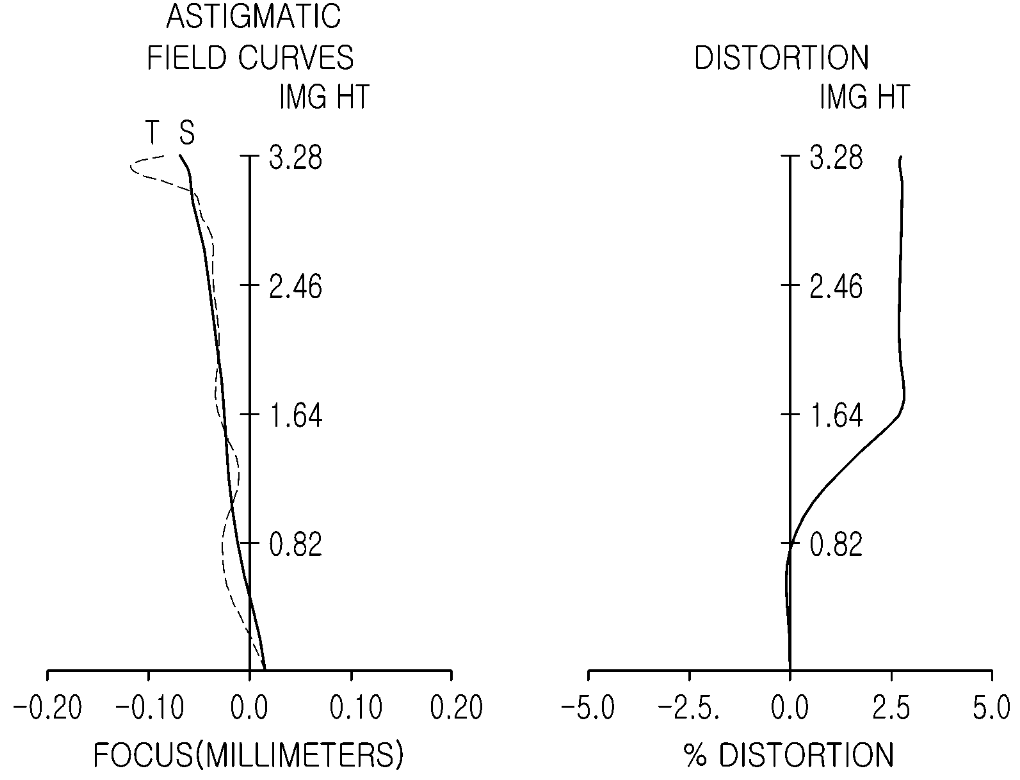
FIG. 8 presents graphs having curves representing aberration characteristics of the optical imaging system illustrated in FIG. 7.

Tables 7 and 8 represent characteristics of lenses and aspherical coefficients of the optical imaging system according to the present example embodiment, respectively, and FIG. 8 presents graphs having curves representing aberration characteristics of the optical imaging system according to the present example embodiment.

TABLE 7

| Surface No. | Component | Radius of Curvature | Thickness/Distance | Refractive Index | Abbe Number | Effective Radius |
|---|---|---|---|---|---|---|
| S1 | First Lens | 1.7466 | 0.8150 | 1.543 | 56.0 | 0.725 |
| S2 | | 61.5649 | 0.0238 | | | 0.772 |
| S3 | Second Lens | 8.1279 | 0.2300 | 1.667 | 19.2 | 0.800 |

TABLE 7-continued

| Surface No. | Component | Radius of Curvature | Thickness/Distance | Refractive Index | Abbe Number | Effective Radius |
|---|---|---|---|---|---|---|
| S4 | | 3.6934 | 0.2263 | | | 0.837 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 66.8001 | 0.3687 | 1.534 | 55.7 | 1.260 |
| S10 | | −9.1120 | 0.1400 | | | 1.432 |
| S11 | Fifth Lens | 14.6828 | 0.4500 | 1.647 | 21.5 | 1.760 |
| S12 | | 4.3259 | 0.2560 | | | 2.180 |
| S13 | Sixth Lens | 0.9923 | 0.5252 | 1.534 | 55.7 | 2.460 |
| S14 | | 0.8100 | 0.5285 | | | 2.780 |
| S15 | Filter | Infinity | 0.2100 | | | |
| S16 | | Infinity | 0.2024 | | | |
| S17 | Imaging Plane | | −0.0159 | | | |

TABLE 8

| Surface No. | S1 | S2 | S3 | S4 | S9 |
|---|---|---|---|---|---|
| K | −4.2423E−01 | −9.9000E+01 | −7.1418E+01 | 9.1132E+00 | 9.9000E+01 |
| A | −3.1219E−02 | −2.1145E−01 | −1.5126E−01 | −1.0288E−01 | 1.1837E−02 |
| B | −1.7981E+00 | −3.2869E+00 | −1.7140E−01 | 3.4558E+00 | 3.2438E−03 |
| C | 8.0593E+01 | 7.8574E+01 | −8.4556E+00 | −5.3204E+01 | −6.8871E−01 |
| D | −1.5667E+03 | −1.0648E+03 | 3.3589E+02 | 5.2467E+02 | 2.0331E+00 |
| E | 1.8151E+04 | 9.8637E+03 | −4.6480E+03 | −3.4935E+03 | 1.4844E+00 |
| F | −1.3891E+05 | −6.5086E+04 | 3.7161E+04 | 1.6315E+04 | −1.8600E+01 |
| G | 7.3701E+05 | 3.1128E+05 | −1.9446E+05 | −5.4631E+04 | 4.0098E+01 |
| H | −2.7756E+06 | −1.0860E+06 | 7.0049E+05 | 1.3245E+05 | −3.5195E+01 |
| J | 7.4772E+06 | 2.7569E+06 | −1.7720E+06 | −2.3221E+05 | −4.2851E+00 |
| L | −1.4314E+07 | −5.0276E+06 | 3.1479E+06 | 2.9036E+05 | 4.0970E+01 |
| M | 1.9018E+07 | 6.4064E+06 | −3.8504E+06 | −2.5123E+05 | −4.2755E+01 |
| N | −1.6668E+07 | −5.4084E+06 | 3.0905E+06 | 1.4193E+05 | 2.2309E+01 |
| O | 8.6666E+06 | 2.7154E+06 | −1.4662E+06 | −4.6611E+04 | −6.1141E+00 |
| P | −2.0244E+06 | −6.1336E+05 | 3.1175E+05 | 6.6368E+03 | 7.0287E−01 |
| Surface No. | S10 | S11 | S12 | S13 | S14 |
| K | −8.1215E+01 | 6.1847E+01 | −8.3624E+00 | −2.5798E+00 | −9.6148E−01 |
| A | 1.8258E−01 | 2.8599E−01 | −3.2009E−01 | −7.5268E−01 | −8.3773E−01 |
| B | 8.1576E−01 | 5.0723E−01 | 1.8765E+00 | 1.4101E+00 | 1.1226E+00 |
| C | −8.1492E+00 | −4.3279E+00 | −4.6019E+00 | −1.9079E+00 | −1.2360E+00 |
| D | 2.9508E+01 | 1.1919E+01 | 6.7279E+00 | 1.7847E+00 | 9.9799E−01 |
| E | −6.6752E+01 | −2.0765E+01 | −6.6391E+00 | −1.1800E+00 | −5.8482E−01 |
| F | 1.0760E+02 | 2.5771E+01 | 4.6603E+00 | 5.4847E−01 | 2.5020E−01 |
| G | −1.3021E+02 | −2.3607E+01 | −2.3901E+00 | −1.7528E−01 | −7.8962E−02 |
| H | 1.2010E+02 | 1.6059E+01 | 9.0645E−01 | 3.6666E−02 | 1.8509E−02 |
| J | −8.3838E+01 | −8.0473E+00 | −2.5432E−01 | −4.3042E−03 | −3.2191E−03 |
| L | 4.3326E+01 | 2.9160E+00 | 5.2165E−02 | 5.5368E−05 | 4.1047E−04 |
| M | −1.5970E+01 | −7.3996E−01 | −7.6076E−03 | 6.6877E−05 | −3.7328E−05 |
| N | 3.9516E+00 | 1.2434E−01 | 7.4716E−04 | −1.0598E−05 | 2.2946E−06 |
| O | −5.8605E−01 | −1.2403E−02 | −4.4291E−05 | 7.2941E−07 | −8.5520E−08 |
| P | 3.9268E−02 | 5.5514E−04 | 1.1967E−06 | −2.0021E−08 | 1.4603E−09 |

Figure 9:
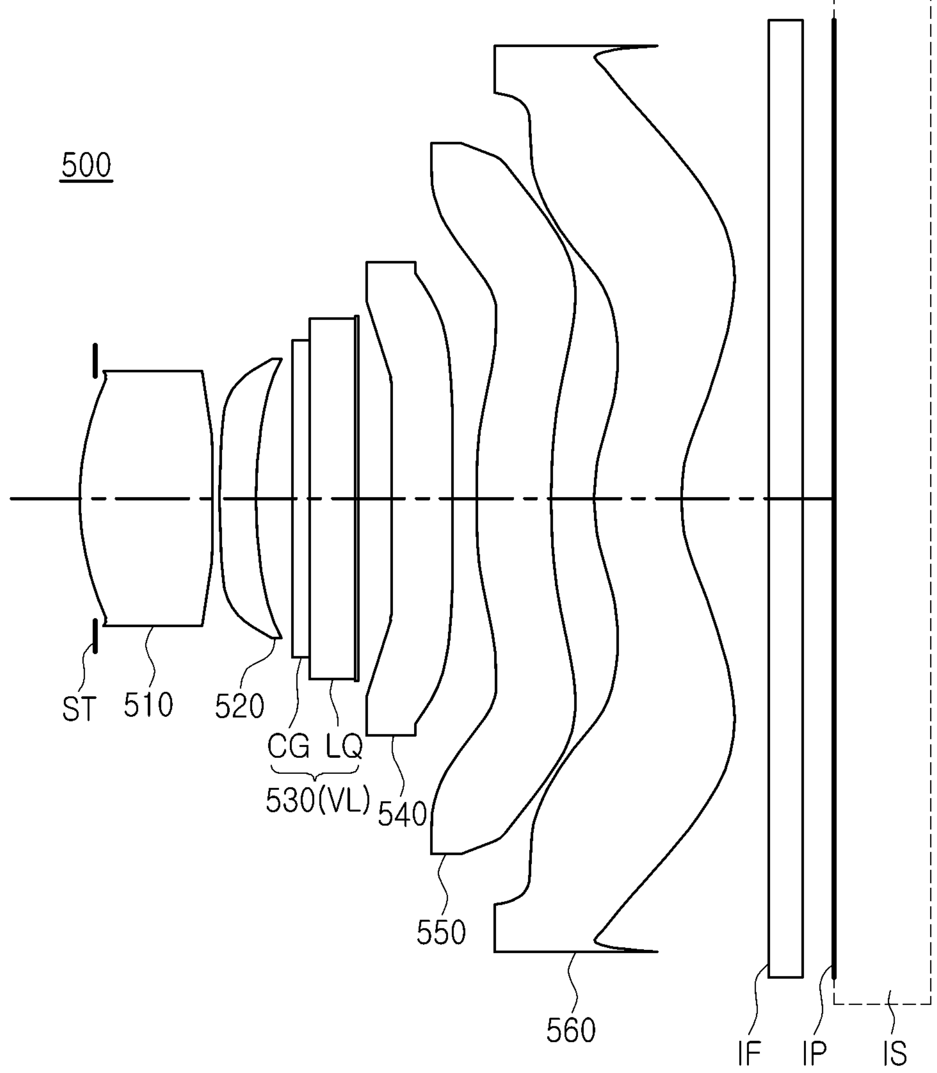
FIG. 9 is a view illustrating an optical imaging system according to a fifth example embodiment in the present disclosure.

An optical imaging system according to a fifth example embodiment will be described with reference to FIG. 9.

The optical imaging system 500 according to the fifth example embodiment may include a plurality of lenses. For example, the optical imaging system 500 may include a first lens 510, a second lens 520, a third lens 530, a fourth lens 540, a fifth lens 550, and a sixth lens 560.

The optical imaging system 500 may include a variable focus lens. For example, one of the first lens 510 to the sixth lens 560 may be a variable focus lens.

The first lens 510 may have positive refractive power, and an object-side surface thereof may be convex while an image-side surface thereof may be concave. The second lens 520 may have negative refractive power, and an object-side surface thereof may be convex while an image-side surface thereof may be concave. The third lens 530 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 540 may have positive refractive power, and an object-side surface thereof may be convex while an image-side surface thereof may be convex. The fifth lens 550 may have negative refractive power, and an object-side surface thereof may be convex while an image-side surface thereof may be concave. The fifth lens 550 may have an inflection point. The sixth lens 560 may have positive refractive power, and an object-side surface thereof may be convex while an image-side surface thereof may be concave. The sixth lens 560 may have an inflection point.

The optical imaging system 500 may include an imaging plane IP In the present example embodiment, the imaging plane IP may be formed on a surface of an image sensor IS. The optical imaging system 500 may include a stop ST. For example, the stop ST may be disposed on the object-side surface of the first lens 510. The optical imaging system 500 may include a filter IF. The filter IF may be disposed between the sixth lens 560 and the imaging plane IP.

Figure 10:
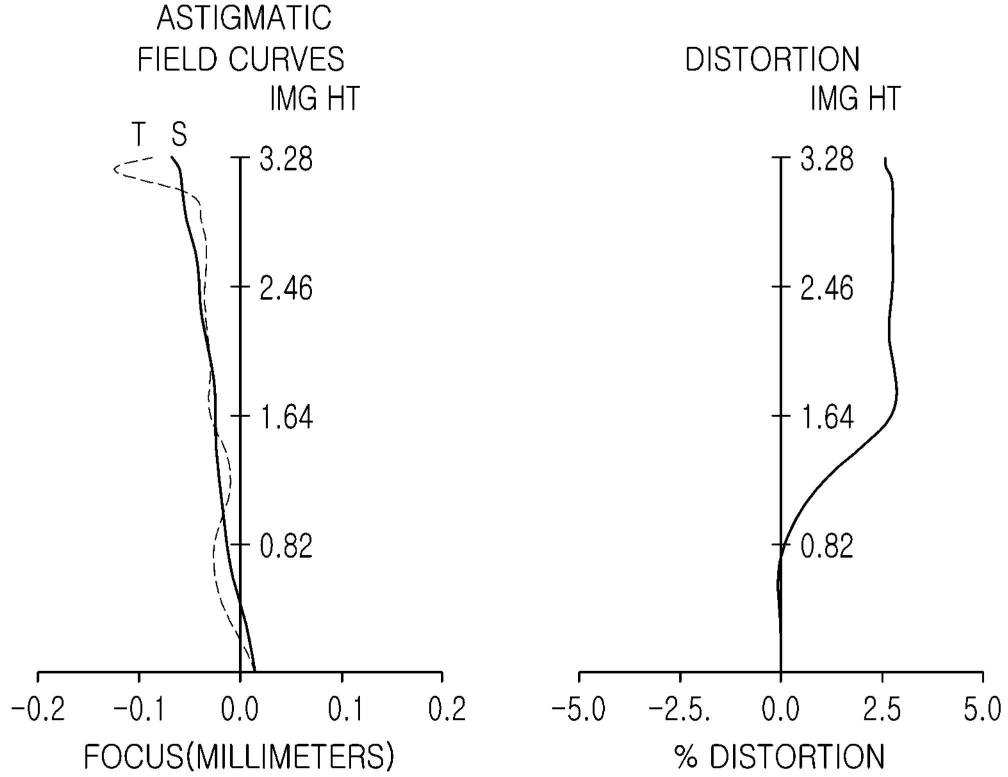
FIG. 10 presents graphs having curves representing aberration characteristics of the optical imaging system illustrated in FIG. 9.

Tables 9 and 10 represent characteristics of lenses and aspherical coefficients of the optical imaging system according to the present example embodiment, respectively, and FIG. 10 presents graphs having curves representing aberration characteristics of the optical imaging system according to the present example embodiment.

TABLE 9

| Surface No. | Component | Radius of Curvature | Thickness/ Distance | Refractive Index | Abbe Number | Effective Radius |
|---|---|---|---|---|---|---|
| S1 | First Lens | 1.7453 | 0.8098 | 1.543 | 56.0 | 0.725 |
| S2 | | 53.6261 | 0.0238 | | | 0.772 |
| S3 | Second Lens | 7.9790 | 0.2300 | 1.667 | 19.2 | 0.800 |
| S4 | | 3.6929 | 0.2251 | | | 0.837 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 67.4453 | 0.3706 | 1.534 | 55.7 | 1.197 |
| S10 | | −9.0930 | 0.1416 | | | 1.432 |
| S11 | Fifth Lens | 14.7817 | 0.4498 | 1.647 | 21.5 | 1.722 |
| S12 | | 4.2730 | 0.2593 | | | 2.152 |
| S13 | Sixth Lens | 0.9904 | 0.5250 | 1.534 | 55.7 | 2.405 |
| S14 | | 0.8116 | 0.5285 | | | 2.723 |
| S15 | Filter | Infinity | 0.2100 | | | |
| S16 | | Infinity | 0.2013 | | | |
| S17 | Imaging Plane | | −0.0149 | | | |

TABLE 10

| Surface No. | S1 | S2 | S3 | S4 | S9 |
|---|---|---|---|---|---|
| K | −4.2279E−01 | −9.9000E+01 | −7.0102E+01 | 9.0907E+00 | 9.9000E+01 |
| A | −3.0686E−02 | −2.4155E−01 | −1.6929E−01 | −1.0360E−01 | 7.0233E−03 |
| B | −1.7409E+00 | −1.9268E+00 | 5.3730E−01 | 3.5492E+00 | 5.6768E−02 |
| C | 7.9169E+01 | 4.8169E+01 | −2.2277E+01 | −5.5853E+01 | −1.2913E+00 |
| D | −1.5540E+03 | −6.5208E+02 | 5.0738E+02 | 5.6445E+02 | 6.5214E+00 |
| E | 1.8138E+04 | 6.1662E+03 | −6.1098E+03 | −3.8617E+03 | −2.0150E+01 |
| F | −1.3967E+05 | −4.2207E+04 | 4.6046E+04 | 1.8565E+04 | 5.1557E+01 |
| G | 7.4487E+05 | 2.1086E+05 | −2.3371E+05 | −6.4077E+04 | −1.1811E+02 |
| H | −2.8181E+06 | −7.6893E+05 | 8.2745E+05 | 1.6025E+05 | 2.1766E+02 |
| J | 7.6242E+06 | 2.0350E+06 | −2.0719E+06 | −2.8993E+05 | −2.9244E+02 |
| L | −1.4655E+07 | −3.8533E+06 | 3.6585E+06 | 3.7431E+05 | 2.7342E+02 |
| M | 1.9547E+07 | 5.0762E+06 | −4.4592E+06 | −3.3462E+05 | −1.7235E+02 |
| N | −1.7200E+07 | −4.4123E+06 | 3.5723E+06 | 1.9558E+05 | 6.9776E+01 |
| O | 8.9786E+06 | 2.2725E+06 | −1.6933E+06 | −6.6640E+04 | −1.6385E+01 |
| P | −2.1058E+06 | −5.2491E+05 | 3.5995E+05 | 9.9010E+03 | 1.6971E+00 |

| Surface No. | S10 | S11 | S12 | S13 | S14 |
|---|---|---|---|---|---|
| K | −8.5573E+01 | 6.1117E+01 | −8.3877E+00 | −2.5894E+00 | −9.6203E−01 |
| A | 1.8934E−01 | 2.9297E−01 | −3.1946E−01 | −7.5341E−01 | −8.4420E−01 |
| B | 7.2600E−01 | 4.3549E−01 | 1.8612E+00 | 1.4187E+00 | 1.1546E+00 |
| C | −7.5919E+00 | −3.9280E+00 | −4.5279E+00 | −1.9393E+00 | −1.3056E+00 |
| D | 2.7534E+01 | 1.0628E+01 | 6.5468E+00 | 1.8455E+00 | 1.0850E+00 |
| E | −6.2310E+01 | −1.8069E+01 | −6.3676E+00 | −1.2521E+00 | −6.5500E−01 |
| F | 1.0093E+02 | 2.1890E+01 | 4.3890E+00 | 6.0524E−01 | 2.8894E−01 |
| G | −1.2344E+02 | −1.9626E+01 | −2.2011E+00 | −2.0615E−01 | −9.4091E−02 |
| H | 1.1557E+02 | 1.3100E+01 | 8.1254E−01 | 4.8525E−02 | 2.2758E−02 |
| J | −8.2037E+01 | −6.4496E+00 | −2.2083E−01 | −7.5491E−03 | −4.0804E−03 |
| L | 4.3098E+01 | 2.2958E+00 | 4.3654E−02 | 6.8385E−04 | 5.3526E−04 |
| M | −1.6127E+01 | −5.7144E−01 | −6.1033E−03 | −1.7307E−05 | −4.9924E−05 |

TABLE 10-continued

| | | | | | |
|---|---|---|---|---|---|
| N | 4.0437E+00 | 9.3954E−02 | 5.7147E−04 | −3.1812E−06 | 3.1355E−06 |
| O | −6.0674E−01 | −9.1385E−03 | −3.2106E−05 | 3.4287E−07 | −1.1887E−07 |
| P | 4.1074E−02 | 3.9724E−04 | 8.1671E−07 | −1.0994E−08 | 2.0550E−09 |

Figure 11:
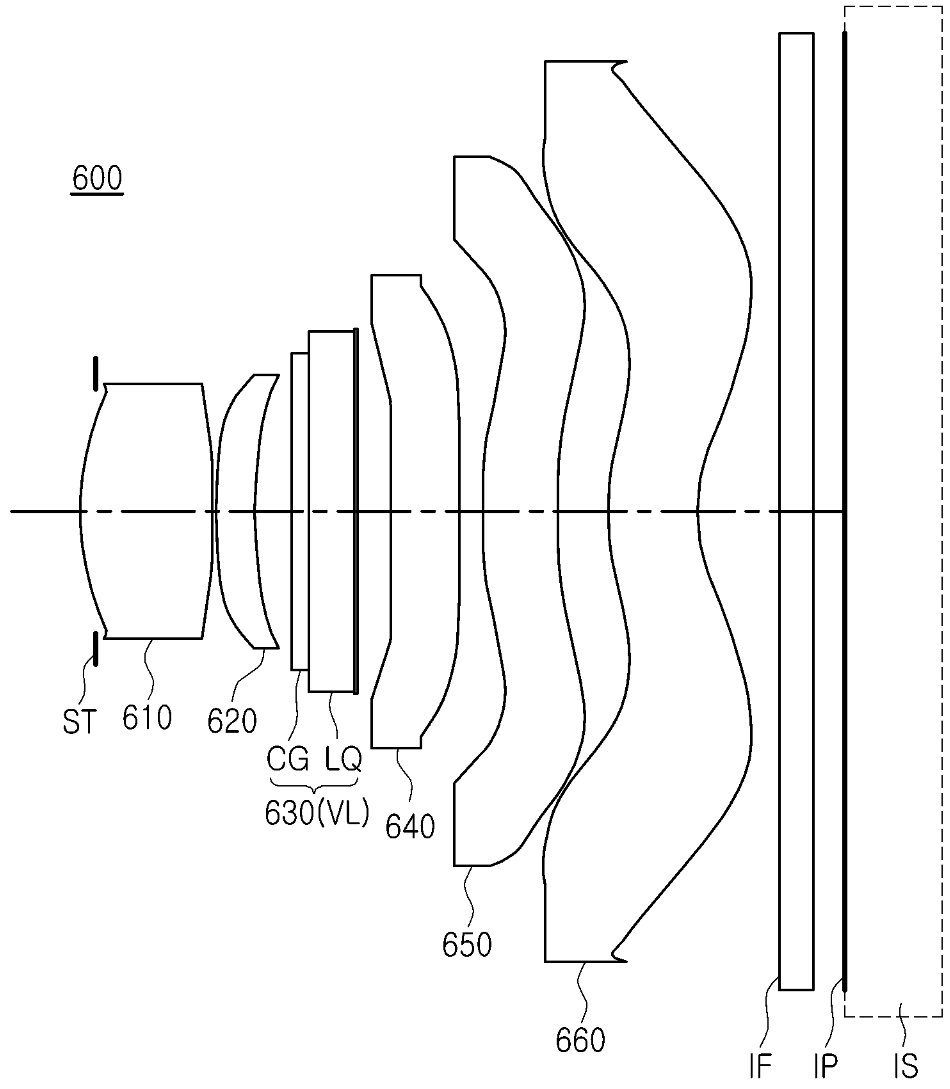
FIG. 11 is a view illustrating an optical imaging system according to a sixth example embodiment in the present disclosure.

An optical imaging system according to a sixth example embodiment will be described with reference to FIG. 11.

The optical imaging system 600 according to the sixth example embodiment may include a plurality of lenses. For example, the optical imaging system 600 may include a first lens 610, a second lens 620, a third lens 630, a fourth lens 640, a fifth lens 650, and a sixth lens 660.

The optical imaging system 600 may include a variable focus lens. For example, one of the first lens 610 to the sixth lens 660 may be a variable focus lens.

The first lens 610 may have positive refractive power, and an object-side surface thereof may be convex while an image-side surface thereof may be convex. The second lens 620 may have negative refractive power, and an object-side surface thereof may be convex while an image-side surface thereof may be concave. The third lens 630 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 640 may have positive refractive power, and an object-side surface thereof may be convex while an image-side surface thereof may be convex. The fifth lens 650 may have negative refractive power, and an object-side surface thereof may be convex while an image-side surface thereof may be concave. The fifth lens 650 may have an inflection point. The sixth lens 660 may have positive refractive power, and an object-side surface thereof may be convex while an image-side surface thereof may be concave. The sixth lens 660 may have an inflection point.

The optical imaging system 600 may include an imaging plane IP In the present example embodiment, the imaging plane IP may be formed on a surface of an image sensor IS. The optical imaging system 600 may include a stop ST. For example, the stop ST may be disposed on the object-side surface of the first lens 610. The optical imaging system 600 may include a filter IF. The filter IF may be disposed between the sixth lens 660 and the imaging plane IP.

Figure 12:
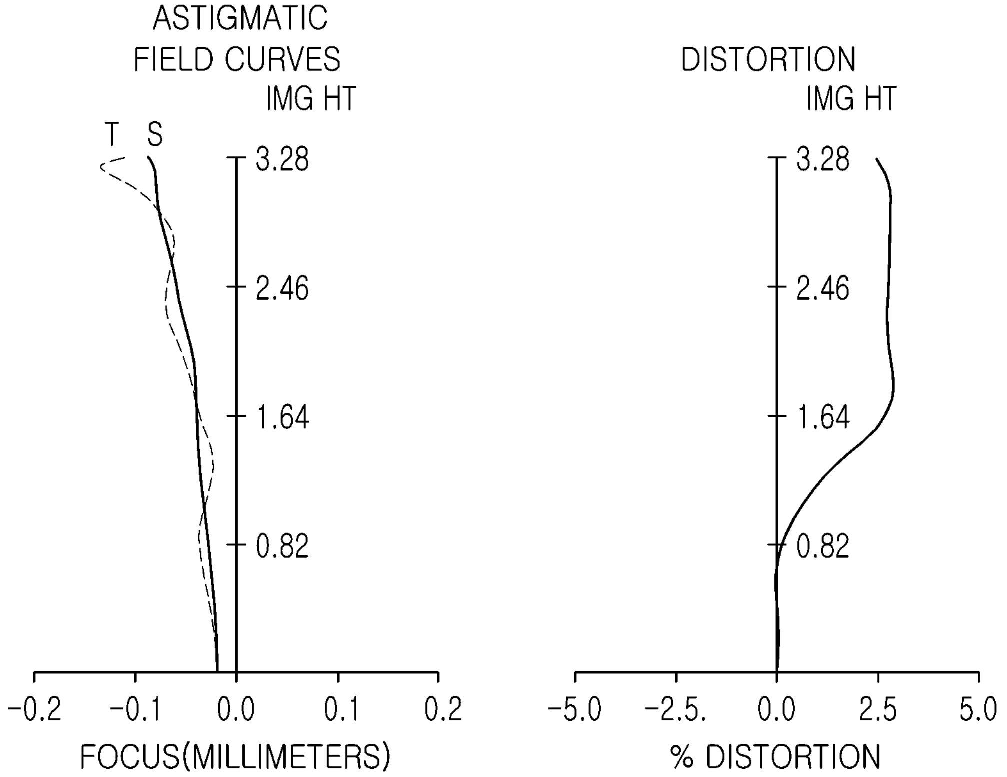
FIG. 12 presents graphs having curves representing aberration characteristics of the optical imaging system illustrated in FIG. 11.

Tables 11 and 12 represent characteristics of lenses and aspherical coefficients of the optical imaging system according to the present example embodiment, respectively, and FIG. 12 presents graphs having curves representing aberration characteristics of the optical imaging system according to the present example embodiment.

TABLE 11

| Surface No. | Component | Radius of Curvature | Thickness/ Distance | Refractive Index | Abbe Number | Effective Radius |
|---|---|---|---|---|---|---|
| S1 | First Lens | 1.7669 | 0.8000 | 1.543 | 56.0 | 0.725 |
| S2 | | −72.0404 | 0.0238 | | | 0.772 |
| S3 | Second Lens | 10.6926 | 0.2300 | 1.657 | 20.4 | 0.800 |
| S4 | | 3.8053 | 0.2224 | | | 0.845 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 57.0419 | 0.4169 | 1.534 | 55.7 | 1.198 |
| S10 | | −9.2670 | 0.1413 | | | 1.432 |
| S11 | Fifth Lens | 14.1090 | 0.4500 | 1.647 | 21.5 | 1.726 |
| S12 | | 4.1534 | 0.2858 | | | 2.150 |
| S13 | Sixth Lens | 1.0041 | 0.5499 | 1.534 | 55.7 | 2.416 |
| S14 | | 0.8212 | 0.4950 | | | 2.738 |
| S15 | Filter | Infinity | 0.2100 | | | |
| S16 | | Infinity | 0.2000 | | | |
| S17 | Imaging Plane | | 0.0200 | | | |

TABLE 12

| Surface No. | S1 | S2 | S3 | S4 | S9 |
|---|---|---|---|---|---|
| K | −4.6168E−01 | 9.9000E+01 | −9.9000E+01 | 8.6845E+00 | 9.9000E+01 |
| A | −1.1951E−01 | −2.7965E−01 | −2.4215E−01 | −2.9438E−02 | 6.6661E−03 |
| B | 1.9707E+00 | 4.7911E−01 | 3.1987E+00 | 9.9716E−01 | −9.7632E−02 |
| C | −5.1576E+00 | −1.8487E+00 | −7.4205E+01 | −8.4642E+00 | −2.6906E−01 |
| D | −3.6416E+02 | 3.1371E+01 | 1.1795E+03 | 1.5265E+01 | 1.9467E+00 |

TABLE 12-continued

| | | | | | |
|---|---|---|---|---|---|
| E | 6.9255E+03 | −2.9391E+02 | −1.2096E+04 | 3.8025E+02 | −3.4160E+00 |
| F | −6.5844E+04 | 1.0084E+03 | 8.3589E+04 | −4.1846E+03 | −7.5999E−03 |
| G | 3.9593E+05 | 3.0177E+03 | −4.0241E+05 | 2.2770E+04 | 6.1659E+00 |
| H | −1.6176E+06 | −4.4446E+04 | 1.3758E+06 | −7.8764E+04 | −2.2642E+00 |
| J | 4.6117E+06 | 2.0531E+05 | −3.3623E+06 | 1.8514E+05 | −1.5037E+01 |
| L | −9.1983E+06 | −5.4227E+05 | 5.8340E+06 | −3.0069E+05 | 2.8529E+01 |
| M | 1.2599E+07 | 8.9444E+05 | −7.0195E+06 | 3.3327E+05 | −2.4848E+01 |
| N | −1.1300E+07 | −9.1377E+05 | 5.5691E+06 | −2.4112E+05 | 1.2077E+01 |
| O | 5.9803E+06 | 5.3090E+05 | −2.6206E+06 | 1.0277E+05 | −3.1767E+00 |
| P | −1.4162E+06 | −1.3444E+05 | 5.5400E+05 | −1.9590E+04 | 3.5449E−01 |

| Surface No. | S10 | S11 | S12 | S13 | S14 |
|---|---|---|---|---|---|
| K | −5.1889E+01 | 6.0172E+01 | −7.2268E+00 | −2.5650E+00 | −9.6135E−01 |
| A | 2.4732E−01 | 3.1989E−01 | −3.1618E−01 | −7.3359E−01 | −8.3040E−01 |
| B | 1.0720E−01 | 1.5952E−01 | 1.7861E+00 | 1.4062E+00 | 1.1839E+00 |
| C | −4.0867E+00 | −2.5729E+00 | −4.2923E+00 | −2.0231E+00 | −1.4180E+00 |
| D | 1.4986E+01 | 6.7367E+00 | 6.2020E+00 | 2.0688E+00 | 1.2509E+00 |
| E | −3.1369E+01 | −1.0543E+01 | −6.0834E+00 | −1.5385E+00 | −8.0164E−01 |
| F | 4.5283E+01 | 1.1494E+01 | 4.2604E+00 | 8.3752E−01 | 3.7542E−01 |
| G | −4.8524E+01 | −9.1478E+00 | −2.1839E+00 | −3.3497E−01 | −1.2964E−01 |
| H | 3.9803E+01 | 5.3651E+00 | 8.2787E−01 | 9.8795E−02 | 3.3137E−02 |
| J | −2.5072E+01 | −2.2931E+00 | −2.3183E−01 | −2.1462E−02 | −6.2424E−03 |
| L | 1.1906E+01 | 6.9492E−01 | 4.7336E−02 | 3.3964E−03 | 8.5396E−04 |
| M | −4.1030E+00 | −1.4231E−01 | −6.8466E−03 | −3.8128E−04 | −8.2366E−05 |
| N | 9.6289E−01 | 1.8086E−02 | 6.6401E−04 | 2.8793E−05 | 5.3029E−06 |
| O | −1.3700E−01 | −1.1987E−03 | −3.8685E−05 | −1.3123E−06 | −2.0432E−07 |
| P | 8.8872E−03 | 2.5104E−05 | 1.0221E−06 | 2.7278E−08 | 3.5604E−09 |

Figure 13:
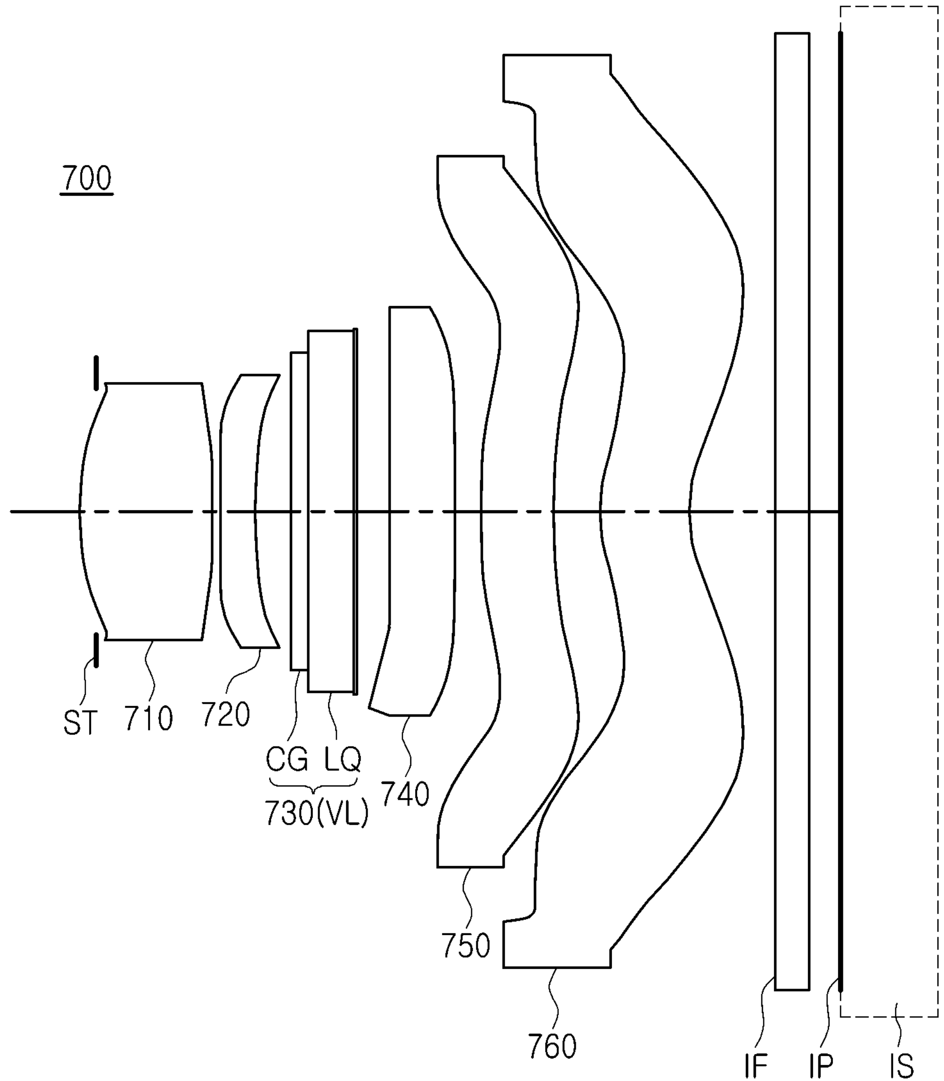
FIG. 13 is a view illustrating an optical imaging system according to a seventh example embodiment in the present disclosure.

An optical imaging system according to a seventh example embodiment will be described with reference to FIG. 13.

The optical imaging system 700 according to the seventh example embodiment may include a plurality of lenses. For example, the optical imaging system 700 may include a first lens 710, a second lens 720, a third lens 730, a fourth lens 740, a fifth lens 750, and a sixth lens 760.

The optical imaging system 700 may include a variable focus lens. For example, one of the first lens 710 to the sixth lens 760 may be a variable focus lens.

The first lens 710 may have positive refractive power, and an object-side surface thereof may be convex while an image-side surface thereof may be convex. The second lens 720 may have negative refractive power, and an object-side surface thereof may be convex while an image-side surface thereof may be concave. The third lens 730 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 740 may have positive refractive power, and an object-side surface thereof may be convex while an image-side surface thereof may be convex. The fifth lens 750 may have negative refractive power, and an object-side surface thereof may be convex while an image-side surface thereof may be concave. The fifth lens 750 may have an inflection point. The sixth lens 760 may have negative refractive power, and an object-side surface thereof may be convex while an image-side surface thereof may be concave. The sixth lens 760 may have an inflection point.

The optical imaging system 700 may include an imaging plane IP In the present example embodiment, the imaging plane IP may be formed on a surface of an image sensor IS. The optical imaging system 700 may include a stop ST. For example, the stop ST may be disposed on the object-side surface of the first lens 710. The optical imaging system 700 may include a filter IF. The filter IF may be disposed between the sixth lens 760 and the imaging plane IP.

Figure 14:
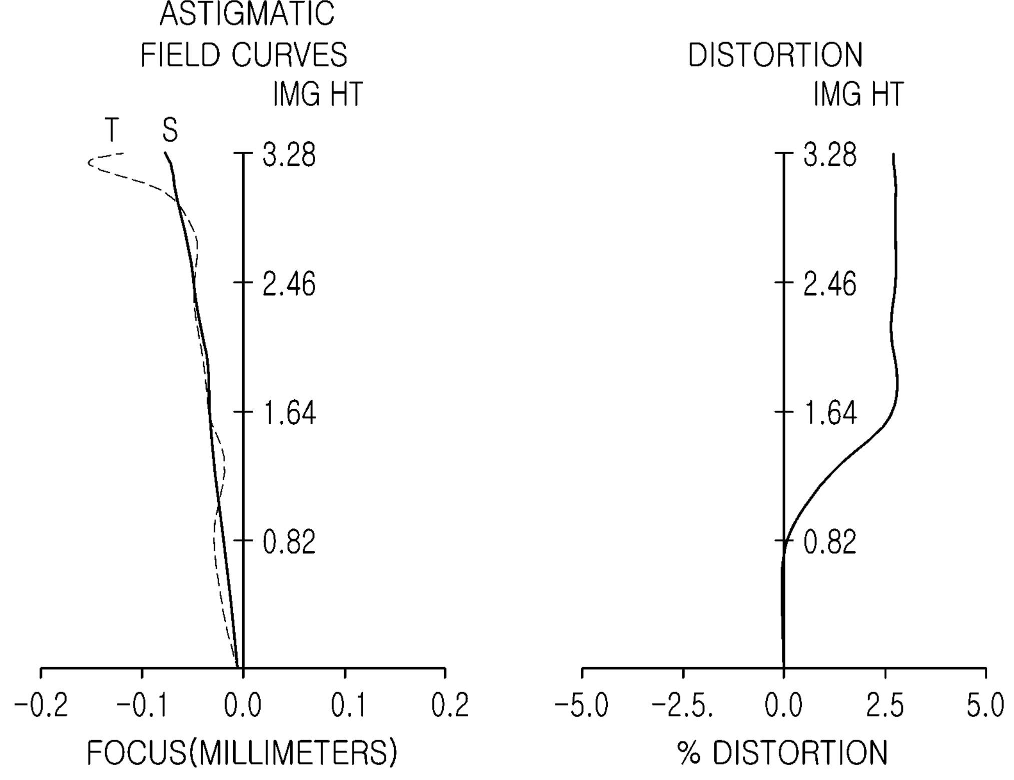
FIG. 14 presents graphs having curves representing aberration characteristics of the optical imaging system illustrated in FIG. 13.

Tables 13 and 14 represent characteristics of lenses and aspherical coefficients of the optical imaging system according to the present example embodiment, respectively, and FIG. 14 presents graphs having curves representing aberration characteristics of the optical imaging system according to the present example embodiment.

TABLE 13

| Surface No. | Component | Radius of Curvature | Thickness/ Distance | Refractive Index | Abbe Number | Effective Radius |
|---|---|---|---|---|---|---|
| S1 | First Lens | 1.7526 | 0.8000 | 1.543 | 56.0 | 0.725 |
| S2 | | −46.3907 | 0.0238 | | | 0.772 |
| S3 | Second Lens | 11.6472 | 0.2300 | 1.657 | 20.4 | 0.798 |
| S4 | | 3.7555 | 0.2227 | | | 0.838 |
| S5 | Third Lens | Infinity | 0.1000 | 1.516 | 64.2 | 1.100 |
| S6 | | Infinity | 0.2800 | 1.548 | 30.0 | 1.100 |

TABLE 13-continued

| Surface No. | Component | Radius of Curvature | Thickness/ Distance | Refractive Index | Abbe Number | Effective Radius |
|---|---|---|---|---|---|---|
| S7 | | Infinity | 0.0200 | 1.529 | 65.4 | 1.100 |
| S8 | | Infinity | 0.2000 | | | 1.100 |
| S9 | Fourth Lens | 57.3964 | 0.3884 | 1.534 | 55.7 | 1.260 |
| S10 | | −9.2470 | 0.1422 | | | 1.432 |
| S11 | Fifth Lens | 14.1780 | 0.4500 | 1.647 | 21.5 | 1.760 |
| S12 | | 4.3684 | 0.2809 | | | 2.180 |
| S13 | Sixth Lens | 1.0053 | 0.5370 | 1.534 | 55.7 | 2.460 |
| S14 | | 0.8126 | 0.5103 | | | 2.780 |
| S15 | Filter | Infinity | 0.2100 | | | |
| S16 | | Infinity | 0.2000 | | | |
| S17 | Imaging Plane | | 0.0047 | | | |

TABLE 14

| Surface No. | S1 | S2 | S3 | S4 | S9 |
|---|---|---|---|---|---|
| K | −4.4955E−01 | −3.1007E+01 | −9.9000E+01 | 8.9530E+00 | 9.9000E+01 |
| A | −6.6593E−02 | −2.5123E−01 | −2.3753E−01 | −6.3115E−02 | 3.4175E−02 |
| B | −4.3861E−01 | −4.8023E−01 | 2.9966E+00 | 2.0688E+00 | −4.1885E−01 |
| C | 5.2571E+01 | 9.4595E+00 | −7.4907E+01 | −2.8283E+01 | 2.5020E+00 |
| D | −1.2057E+03 | −4.1833E+00 | 1.2504E+03 | 2.4996E+02 | −1.3731E+01 |
| E | 1.5000E+04 | −8.6941E+02 | −1.3184E+04 | −1.4873E+03 | 5.6006E+01 |
| F | −1.1939E+05 | 9.3047E+03 | 9.2722E+04 | 6.1939E+03 | −1.5468E+02 |
| G | 6.4871E+05 | −5.1180E+04 | −4.5181E+05 | −1.8501E+04 | 2.8810E+02 |
| H | −2.4804E+06 | 1.7406E+05 | 1.5582E+06 | 4.0145E+04 | −3.6545E+02 |
| J | 6.7480E+06 | −3.8095E+05 | −3.8320E+06 | −6.3400E+04 | 3.1461E+02 |
| L | −1.2999E+07 | 5.2473E+05 | 6.6791E+06 | 7.2192E+04 | −1.7844E+02 |
| M | 1.7335E+07 | −4.0725E+05 | −8.0622E+06 | −5.7796E+04 | 6.1386E+01 |
| N | −1.5223E+07 | 1.0369E+05 | 6.4105E+06 | 3.0894E+04 | −9.8469E+00 |
| 0 | 7.9199E+06 | 7.1847E+04 | −3.0207E+06 | −9.8947E+03 | −3.5900E−01 |
| P | −1.8492E+06 | −4.3990E+04 | 6.3909E+05 | 1.4322E+03 | 2.5647E−01 |

| Surface No. | S10 | S11 | S12 | S13 | S14 |
|---|---|---|---|---|---|
| K | −5.2072E+01 | 5.9962E+01 | −7.1919E+00 | −2.5706E+00 | −9.6123E−01 |
| A | 2.3200E−01 | 3.0403E−01 | −3.0742E−01 | −7.3736E−01 | −8.4241E−01 |
| B | 3.4161E−01 | 3.4949E−01 | 1.7875E+00 | 1.3525E+00 | 1.1634E+00 |
| C | −5.7029E+00 | −3.6233E+00 | −4.3450E+00 | −1.7996E+00 | −1.3293E+00 |
| D | 2.1391E+01 | 1.0068E+01 | 6.3131E+00 | 1.6389E+00 | 1.1176E+00 |
| E | −4.8098E+01 | −1.7472E+01 | −6.2083E+00 | −1.0444E+00 | −6.8547E−01 |
| F | 7.6326E+01 | 2.1524E+01 | 4.3509E+00 | 4.6397E−01 | 3.0879E−01 |
| G | −9.0972E+01 | −1.9545E+01 | −2.2300E+00 | −1.4002E−01 | −1.0309E−01 |
| H | 8.3089E+01 | 1.3174E+01 | 8.4551E−01 | 2.6866E−02 | 2.5609E−02 |
| J | −5.7844E+01 | −6.5413E+00 | −2.3713E−01 | −2.5482E−03 | −4.7127E−03 |
| L | 3.0001E+01 | 2.3489E+00 | 4.8607E−02 | −1.2597E−04 | 6.3296E−04 |
| M | −1.1154E+01 | −5.9074E−01 | −7.0810E−03 | 7.2625E−05 | −6.0221E−05 |
| N | 2.7936E+00 | 9.8386E−02 | 6.9439E−04 | −9.6969E−06 | 3.8413E−06 |
| O | −4.2042E−01 | −9.7261E−03 | −4.1086E−05 | 6.1976E−07 | −1.4723E−07 |
| P | 2.8640E−02 | 4.3148E−04 | 1.1077E−06 | −1.6214E−08 | 2.5619E−09 |

Figure 15:
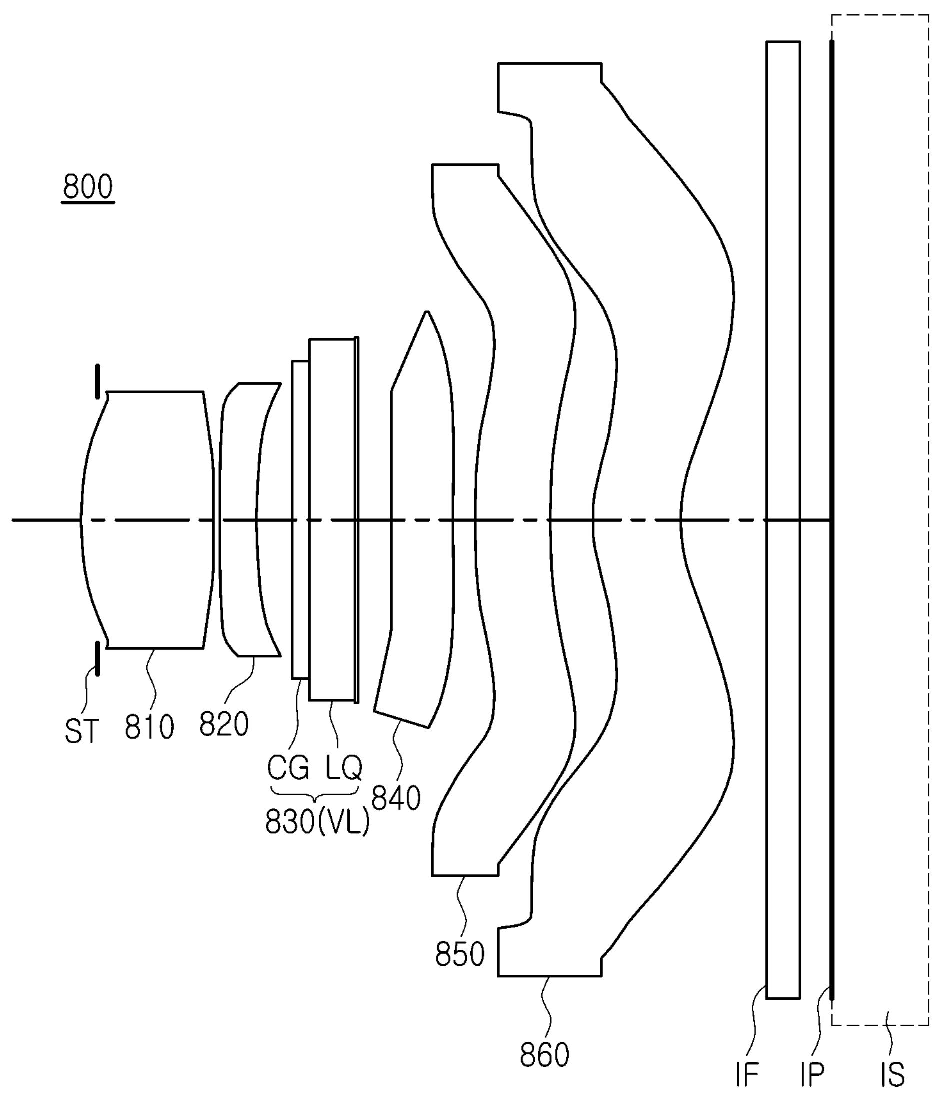
FIG. 15 is a view illustrating an optical imaging system according to an eighth example embodiment in the present disclosure.

An optical imaging system according to an eighth example embodiment will be described with reference to FIG. 15.

The optical imaging system 800 according to the eighth example embodiment may include a plurality of lenses. For example, the optical imaging system 800 may include a first lens 810, a second lens 820, a third lens 830, a fourth lens 840, a fifth lens 850, and a sixth lens 860.

The optical imaging system 800 may include a variable focus lens. For example, one of the first lens 810 to the sixth lens 860 may be a variable focus lens.

The first lens 810 may have positive refractive power, and an object-side surface thereof may be convex while an image-side surface thereof may be convex. The second lens 820 may have negative refractive power, and an object-side surface thereof may be convex while an image-side surface thereof may be concave. The third lens 830 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 840 may have positive refractive power, and an object-side surface thereof may be convex while an image-side surface thereof may be convex. The fifth lens 850 may have negative refractive power, and an object-side surface thereof may be convex while an image-side surface thereof may be concave. The fifth lens 850 may have an inflection point. The sixth lens 860 may have positive refractive power, and an object-side surface thereof may be convex while an image-side surface thereof may be concave. The sixth lens 860 may have an inflection point.

The optical imaging system 800 may include an imaging plane IP In the present example embodiment, the imaging plane IP may be formed on a surface of an image sensor IS. The optical imaging system 800 may include a stop ST. For example, the stop ST may be disposed on the object-side surface of the first lens 810. The optical imaging system 800 may include a filter IF. The filter IF may be disposed between the sixth lens 860 and the imaging plane IP.

Figure 16:
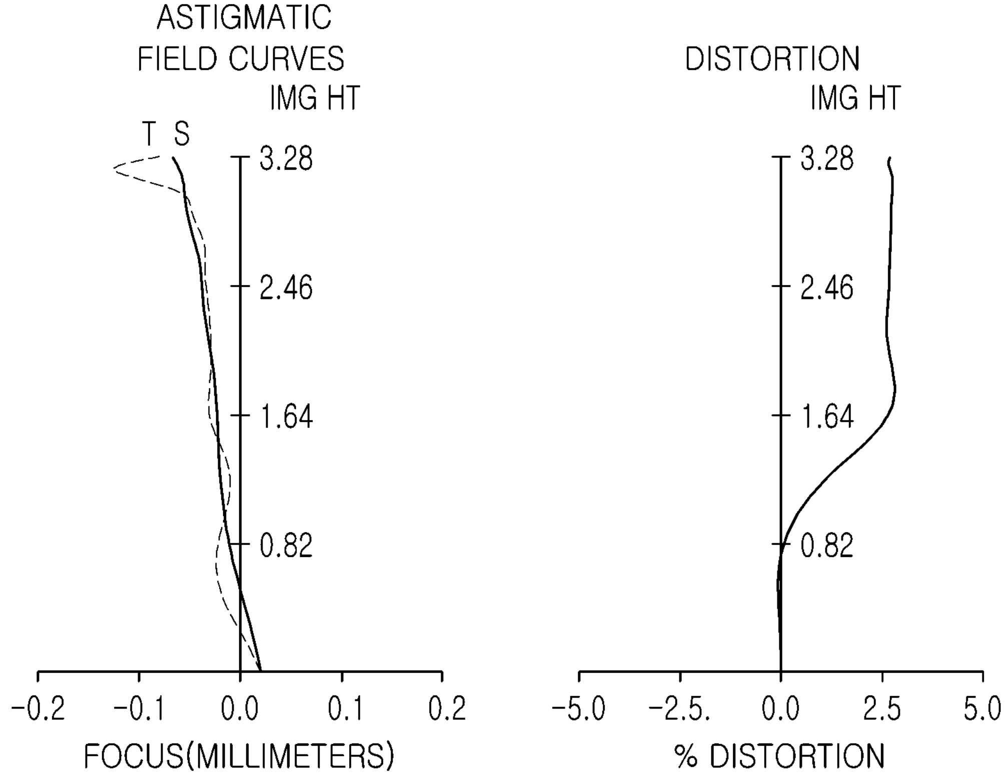
FIG. 16 presents graphs having curves representing aberration characteristics of the optical imaging system illustrated in FIG. 15.

Tables 15 and 16 represent characteristics of lenses and aspherical coefficients of the optical imaging system according to the present example embodiment, respectively, and FIG. 16 presents graphs having curves representing aberration characteristics of the optical imaging system according to the present example embodiment.

TABLE 15

| Surface No. | Component | Radius of Curvature | Thickness/ Distance | Refractive Index | Abbe Number | Effective Radius |
|---|---|---|---|---|---|---|
| S1 | First Lens | 1.7297 | 0.8000 | 1.543 | 56.0 | 0.725 |
| S2 | | −135.7814 | 0.0238 | | | 0.772 |
| S3 | Second Lens | 10.1288 | 0.2300 | 1.657 | 20.4 | 0.797 |
| S4 | | 3.6614 | 0.2275 | | | 0.836 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 57.7271 | 0.3657 | 1.534 | 55.7 | 1.260 |
| S10 | | −9.2491 | 0.1400 | | | 1.432 |
| S11 | Fifth Lens | 14.3492 | 0.4500 | 1.647 | 21.5 | 1.760 |
| S12 | | 4.2353 | 0.2578 | | | 2.180 |
| S13 | Sixth Lens | 0.9869 | 0.5201 | 1.534 | 55.7 | 2.460 |
| S14 | | 0.8100 | 0.5288 | | | 2.780 |
| S15 | Filter | Infinity | 0.2100 | | | |
| S16 | | Infinity | 0.2062 | | | |
| S17 | Imaging Plane | | −0.0200 | | | |

TABLE 16

| Surface No. | S1 | S2 | S3 | S4 | S9 |
|---|---|---|---|---|---|
| K | −4.3782E−01 | 9.9000E+01 | −9.9000E+01 | 9.1955E+00 | 9.9000E+01 |
| A | −1.9657E−02 | −2.3076E−01 | −1.7874E−01 | −1.1543E−01 | 3.0322E−02 |
| B | −2.3463E+00 | −2.5501E+00 | 5.7308E−01 | 3.8999E+00 | −3.0846E−01 |
| C | 9.4107E+01 | 6.2305E+01 | −2.4623E+01 | −6.1802E+01 | 2.1044E+00 |
| D | −1.7621E+03 | −8.1317E+02 | 5.8823E+02 | 6.3162E+02 | −1.3280E+01 |
| E | 1.9934E+04 | 7.2304E+03 | −7.3171E+03 | −4.3844E+03 | 5.6951E+01 |
| F | −1.4964E+05 | −4.6230E+04 | 5.6487E+04 | 2.1488E+04 | −1.5810E+02 |
| G | 7.8029E+05 | 2.1697E+05 | −2.9226E+05 | −7.6110E+04 | 2.9094E+02 |
| H | −2.8912E+06 | −7.5176E+05 | 1.0515E+06 | 1.9701E+05 | −3.6249E+02 |
| J | 7.6686E+06 | 1.9136E+06 | −2.6696E+06 | −3.7283E+05 | 3.0639E+02 |
| L | −1.4462E+07 | −3.5235E+06 | 4.7719E+06 | 5.0990E+05 | −1.7145E+02 |
| M | 1.8933E+07 | 4.5542E+06 | −5.8807E+06 | −4.9045E+05 | 5.9173E+01 |
| N | −1.6357E+07 | −3.9106E+06 | 4.7588E+06 | 3.1450E+05 | −1.0263E+01 |
| O | 8.3845E+06 | 1.9998E+06 | −2.2768E+06 | −1.2061E+05 | 1.1137E−01 |
| P | −1.9311E+06 | −4.6024E+05 | 4.8822E+05 | 2.0908E+04 | 1.6443E−01 |

| Surface No. | S10 | S11 | S12 | S13 | S14 |
|---|---|---|---|---|---|
| K | −9.6433E+01 | 6.0358E+01 | −8.0517E+00 | −2.5763E+00 | −9.6132E−01 |
| A | 1.9732E−01 | 2.9341E−01 | −3.1146E−01 | −7.4702E−01 | −8.3995E−01 |
| B | 6.7725E−01 | 4.8772E−01 | 1.8438E+00 | 1.3979E+00 | 1.1334E+00 |
| C | −7.1254E+00 | −4.2429E+00 | −4.5184E+00 | −1.8939E+00 | −1.2618E+00 |
| D | 2.4931E+01 | 1.1617E+01 | 6.5693E+00 | 1.7700E+00 | 1.0308E+00 |
| E | −5.3766E+01 | −2.0113E+01 | −6.4281E+00 | −1.1669E+00 | −6.1158E−01 |
| F | 8.2624E+01 | 2.4853E+01 | 4.4649E+00 | 5.4126E−01 | 2.6520E−01 |
| G | −9.6281E+01 | −2.2710E+01 | −2.2617E+00 | −1.7349E−01 | −8.4911E−02 |
| H | 8.6879E+01 | 1.5430E+01 | 8.4570E−01 | 3.6912E−02 | 2.0198E−02 |
| J | −6.0273E+01 | −7.7282E+00 | −2.3353E−01 | −4.6384E−03 | −3.5626E−03 |
| L | 3.1312E+01 | 2.7992E+00 | 4.7066E−02 | 1.7054E−04 | 4.6000E−04 |
| M | −1.1681E+01 | −7.0998E−01 | −6.7326E−03 | 4.5119E−05 | −4.2270E−05 |
| N | 2.9332E+00 | 1.1921E−01 | 6.4750E−04 | −8.1709E−06 | 2.6189E−06 |

TABLE 16-continued

| | | | | | |
|---|---|---|---|---|---|
| O | −4.4173E−01 | −1.1878E−02 | −3.7528E−05 | 5.7897E−07 | −9.8122E−08 |
| P | 3.0034E−02 | 5.3091E−04 | 9.8987E−07 | −1.6007E−08 | 1.6801E−09 |

Figure 17:
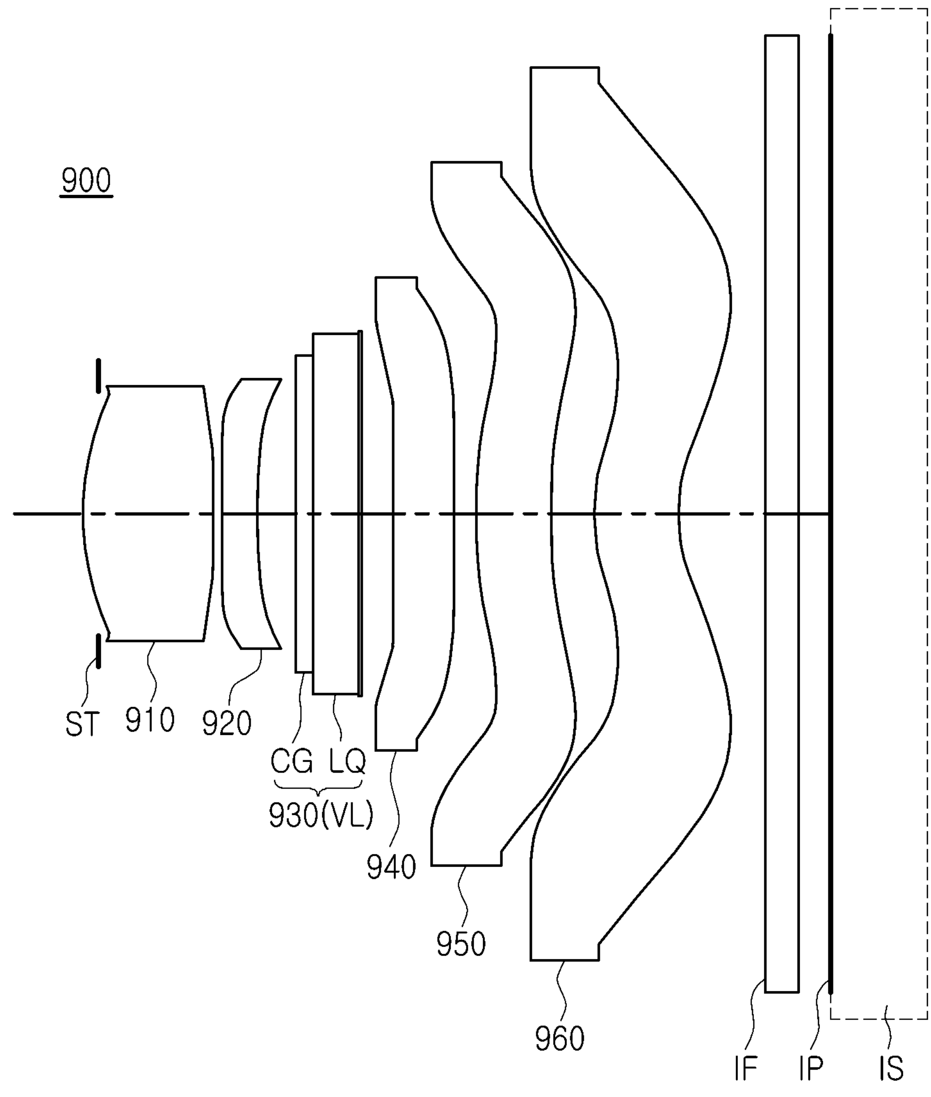
FIG. 17 is a view illustrating an optical imaging system according to a ninth example embodiment in the present disclosure.

An optical imaging system according to a ninth example embodiment will be described with reference to FIG. 17.

The optical imaging system 900 according to the ninth example embodiment may include a plurality of lenses. For example, the optical imaging system 900 may include a first lens 910, a second lens 920, a third lens 930, a fourth lens 940, a fifth lens 950, and a sixth lens 960.

The optical imaging system 900 may include a variable focus lens. For example, one of the first lens 910 to the sixth lens 960 may be a variable focus lens.

The first lens 910 may have positive refractive power, and an object-side surface thereof may be convex while an image-side surface thereof may be concave. The second lens 920 may have negative refractive power, and an object-side surface thereof may be convex while an image-side surface thereof may be concave. The third lens 930 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 940 may have positive refractive power, and an object-side surface thereof may be convex while an image-side surface thereof may be convex. The fifth lens 950 may have negative refractive power, and an object-side surface thereof may be convex while an image-side surface thereof may be concave. The fifth lens 950 may have an inflection point. The sixth lens 960 may have positive refractive power, and an object-side surface thereof may be convex while an image-side surface thereof may be concave. The sixth lens 960 may have an inflection point.

The optical imaging system 900 may include an imaging plane IP In the present example embodiment, the imaging plane IP may be formed on a surface of an image sensor IS. The optical imaging system 900 may include a stop ST. For example, the stop ST may be disposed on the object-side surface of the first lens 910. The optical imaging system 900 may include a filter IF. The filter IF may be disposed between the sixth lens 960 and the imaging plane IP.

Figure 18:
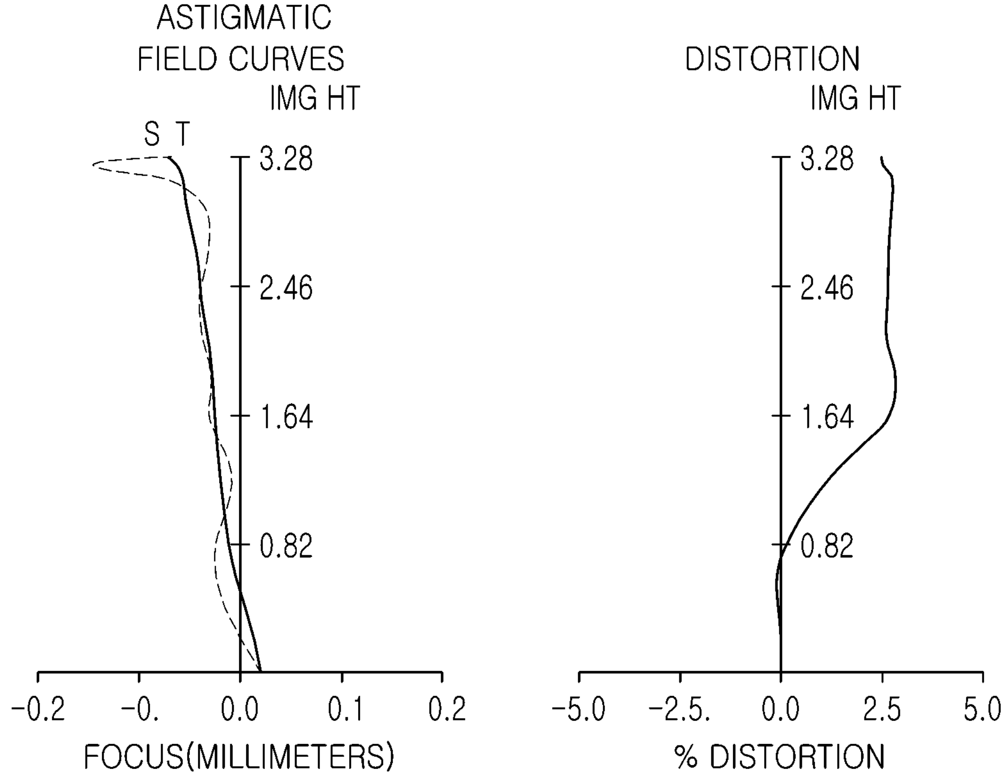
FIG. 18 presents graphs having curves representing aberration characteristics of the optical imaging system illustrated in FIG. 17.

Tables 17 and 18 represent characteristics of lenses and aspherical coefficients of the optical imaging system according to the present example embodiment, respectively, and FIG. 18 presents graphs having curves representing aberration characteristics of the optical imaging system according to the present example embodiment.

TABLE 17

| Surface No. | Component | Radius of Curvature | Thickness/ Distance | Refractive Index | Abbe Number | Effective Radius |
|---|---|---|---|---|---|---|
| S1 | First Lens | 1.7146 | 0.8000 | 1.543 | 56.0 | 0.725 |
| S2 | | 895.3855 | 0.0238 | | | 0.772 |
| S3 | Second Lens | 9.3151 | 0.2300 | 1.657 | 20.4 | 0.797 |
| S4 | | 3.6048 | 0.2294 | | | 0.834 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |
| S8 | | Infinity | 0.2000 | | | 1.100 |
| S9 | Fourth Lens | 57.2654 | 0.3636 | 1.534 | 55.7 | 1.204 |
| S10 | | −9.2625 | 0.1400 | | | 1.432 |
| S11 | Fifth Lens | 14.3082 | 0.4374 | 1.647 | 21.5 | 1.722 |
| S12 | | 4.1496 | 0.2575 | | | 2.142 |
| S13 | Sixth Lens | 0.9826 | 0.5133 | 1.534 | 55.7 | 2.411 |
| S14 | | 0.8094 | 0.5288 | | | 2.727 |
| S15 | Filter | Infinity | 0.2100 | | | |
| S16 | | Infinity | 0.2062 | | | |
| S17 | Imaging Plane | | −0.0200 | | | |

TABLE 18

| Surface No. | S1 | S2 | S3 | S4 | S9 |
|---|---|---|---|---|---|
| K | −4.3151E−01 | −9.9000E+01 | −9.3212E+01 | 9.2040E+00 | 9.9000E+01 |
| A | −2.5434E−02 | −3.0657E−01 | −2.3111E−01 | −1.2018E−01 | 1.7540E−02 |
| B | −2.0056E+00 | 3.5241E−01 | 2.6608E+00 | 4.1952E+00 | −7.6591E−02 |
| C | 8.5850E+01 | 2.7770E+00 | −6.7544E+01 | −6.8828E+01 | −2.4685E−01 |
| D | −1.6501E+03 | −6.3057E+01 | 1.1451E+03 | 7.2949E+02 | 1.7138E+00 |
| E | 1.8985E+04 | 1.0214E+03 | −1.2184E+04 | −5.2674E+03 | −6.5745E+00 |

TABLE 18-continued

| | | | | | |
|---|---|---|---|---|---|
| F | −1.4439E+05 | −1.1045E+04 | 8.6293E+04 | 2.6918E+04 | 2.8052E+01 |
| G | 7.6124E+05 | 7.6953E+04 | −4.2345E+05 | −9.9564E+04 | −9.6501E+01 |
| H | −2.8491E+06 | −3.5551E+05 | 1.4718E+06 | 2.6928E+05 | 2.1826E+02 |
| J | 7.6297E+06 | 1.1158E+06 | −3.6508E+06 | −5.3228E+05 | −3.2204E+02 |
| L | −1.4526E+07 | −2.3960E+06 | 6.4231E+06 | 7.5981E+05 | 3.1473E+02 |
| M | 1.9202E+07 | 3.4700E+06 | −7.8306E+06 | −7.6192E+05 | −2.0294E+02 |
| N | −1.6754E+07 | −3.2439E+06 | 6.2910E+06 | 5.0879E+05 | 8.3244E+01 |
| O | 8.6767E+06 | 1.7686E+06 | −2.9958E+06 | −2.0300E+05 | −1.9722E+01 |
| P | −2.0199E+06 | −4.2734E+05 | 6.4060E+05 | 3.6586E+04 | 2.0578E+00 |

| Surface No. | S10 | S11 | S12 | S13 | S14 |
|---|---|---|---|---|---|
| K | −9.8944E+01 | 6.0361E+01 | −8.2267E+00 | −2.5540E+00 | −9.6139E−01 |
| A | 1.9353E−01 | 3.1008E−01 | −3.1147E−01 | −7.7863E−01 | −8.6577E−01 |
| B | 7.7656E−01 | 3.5802E−01 | 1.8781E+00 | 1.5673E+00 | 1.2468E+00 |
| C | −8.1304E+00 | −3.6166E+00 | −4.6699E+00 | −2.4162E+00 | −1.5251E+00 |
| D | 3.0306E+01 | 9.6399E+00 | 6.9120E+00 | 2.7363E+00 | 1.3905E+00 |
| E | −7.1273E+01 | −1.5873E+01 | −6.9292E+00 | −2.3066E+00 | −9.2713E−01 |
| F | 1.2037E+02 | 1.8456E+01 | 4.9682E+00 | 1.4399E+00 | 4.5311E−01 |
| G | −1.5272E+02 | −1.5783E+01 | −2.6175E+00 | −6.6322E−01 | −1.6343E−01 |
| H | 1.4678E+02 | 1.0008E+01 | 1.0251E+00 | 2.2516E−01 | 4.3624E−02 |
| J | −1.0578E+02 | −4.6654E+00 | −2.9827E−01 | −5.6069E−02 | −8.5761E−03 |
| L | 5.5913E+01 | 1.5670E+00 | 6.3657E−02 | 1.0100E−02 | 1.2231E−03 |
| M | −2.0925E+01 | −3.6630E−01 | −9.6809E−03 | −1.2792E−03 | −1.2285E−04 |
| N | 5.2307E+00 | 5.6176E−02 | 9.9279E−04 | 1.0793E−04 | 8.2266E−06 |
| O | −7.8148E−01 | −5.0477E−03 | −6.1489E−05 | −5.4418E−06 | −3.2926E−07 |
| P | 5.2683E−02 | 1.9998E−04 | 1.7360E−06 | 1.2395E−07 | 5.9530E−09 |

Figure 19:
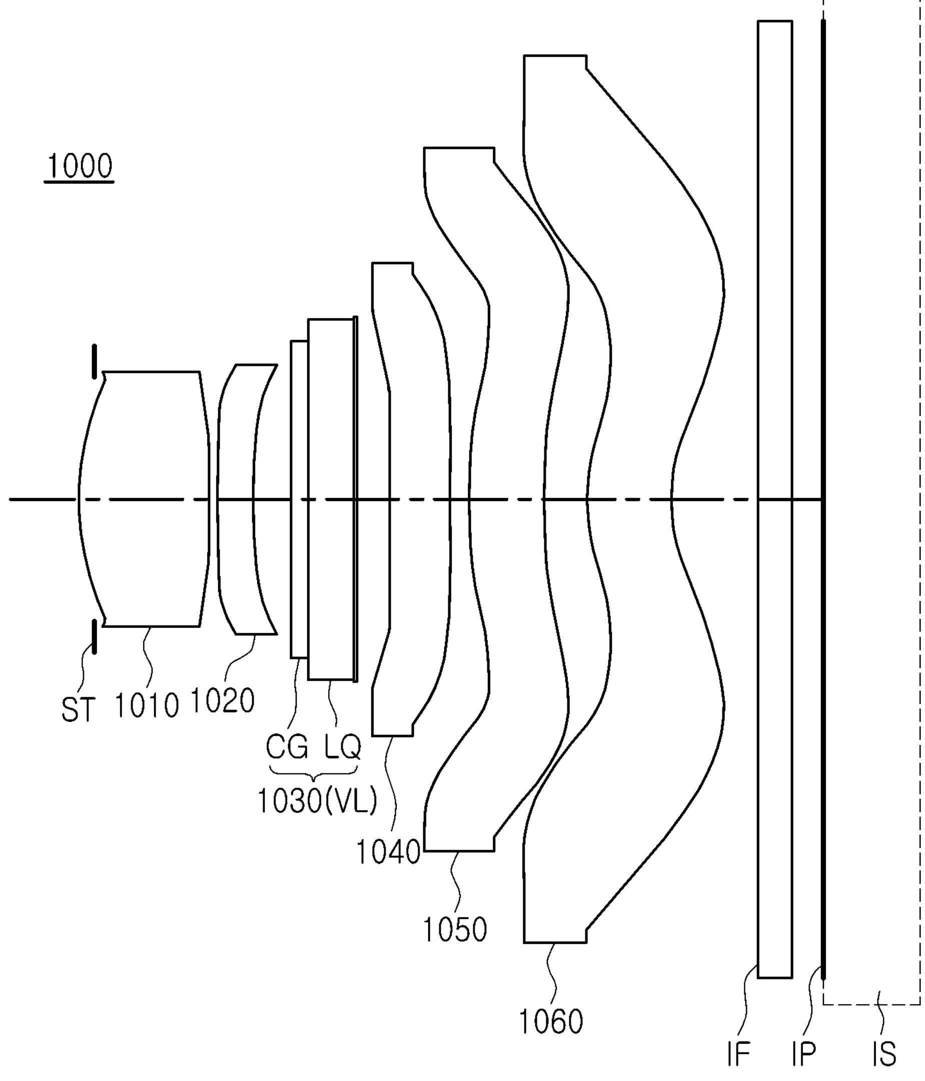
FIG. 19 is a view illustrating an optical imaging system according to a tenth example embodiment in the present disclosure.

An optical imaging system according to a tenth example embodiment will be described with reference to FIG. 19.

The optical imaging system 1000 according to the tenth example embodiment may include a plurality of lenses. For example, the optical imaging system 1000 may include a first lens 1010, a second lens 1020, a third lens 1030, a fourth lens 1040, a fifth lens 1050, and a sixth lens 1060.

The optical imaging system 1000 may include a variable focus lens. For example, one of the first lens 1010 to the sixth lens 1060 may be a variable focus lens.

The first lens 1010 may have positive refractive power, and an object-side surface thereof may be convex while an image-side surface thereof may be concave. The second lens 1020 may have negative refractive power, and an object-side surface thereof may be convex while an image-side surface thereof may be concave. The third lens 1030 may be configured as a variable focus lens VL. The variable focus lens VL may include a cover glass CG and a shape varying part LQ. The cover glass CG may constantly maintain a shape of a first surface (object-side surface in the present example embodiment) of the variable focus lens VL, and the shape varying part LQ may vary a second surface (image-side surface in the present example embodiment) of the variable focus lens VL to a convex or concave shape. Accordingly, the variable focus lens VL may have positive refractive power or negative refractive power depending on a shape of the shape varying part LQ. In addition, the shape varying part LQ may vary a focal length of the variable focus lens VL by changing a radius of curvature of the variable focus lens VL. For example, the shape varying part LQ may vary the focal length of the variable focus lens VL by increasing or decreasing a radius of curvature of the second surface of the variable focus lens VL. The fourth lens 1040 may have positive refractive power, and an object-side surface thereof may be convex while an image-side surface thereof may be convex. The fifth lens 1050 may have negative refractive power, and an object-side surface thereof may be convex while an image-side surface thereof may be concave. The fifth lens 1050 may have an inflection point. The sixth lens 1060 may have positive refractive power, and an object-side surface thereof may be convex while an image-side surface thereof may be concave. The sixth lens 1060 may have an inflection point.

The optical imaging system 1000 may include an imaging plane IP In the present example embodiment, the imaging plane IP may be formed on a surface of an image sensor IS. The optical imaging system 1000 may include a stop ST. For example, the stop ST may be disposed on the object-side surface of the first lens 1010. The optical imaging system 1000 may include a filter IF. The filter IF may be disposed between the sixth lens 1060 and the imaging plane IP.

Figure 20:
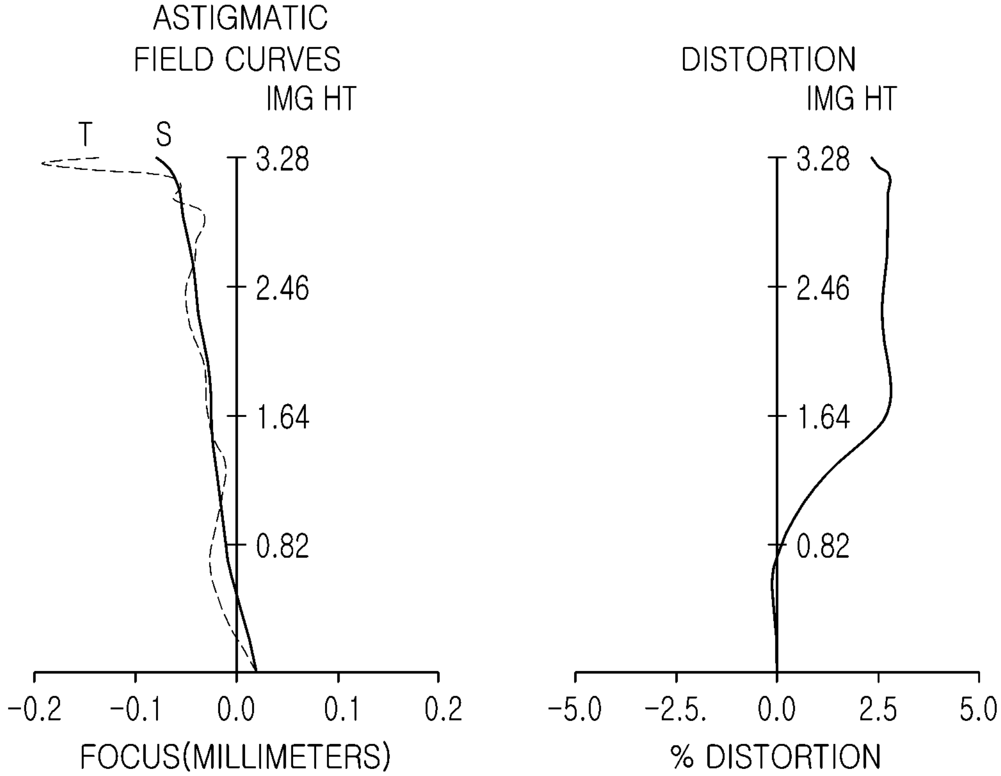
FIG. 20 presents graphs having curves representing aberration characteristics of the optical imaging system illustrated in FIG. 19.

Tables 19 and 20 represent characteristics of lenses and aspherical coefficients of the optical imaging system according to the present example embodiment, respectively, and FIG. 20 presents graphs having curves representing aberration characteristics of the optical imaging system according to the present example embodiment.

TABLE 19

| Surface No. | Component | Radius of Curvature | Thickness/ Distance | Refractive Index | Abbe Number | Effective Radius |
|---|---|---|---|---|---|---|
| S1 | First Lens | 1.6992 | 0.8000 | 1.543 | 56.0 | 0.725 |
| S2 | | 119.6704 | 0.0238 | | | 0.772 |
| S3 | Second Lens | 8.7145 | 0.2300 | 1.657 | 20.4 | 0.797 |
| S4 | | 3.5443 | 0.2317 | | | 0.833 |
| S5 | Third Lens | Infinity | 0.1000 | 1.516 | 64.2 | 1.100 |
| S6 | | Infinity | 0.2800 | 1.548 | 30.0 | 1.100 |
| S7 | | Infinity | 0.0200 | 1.529 | 65.4 | 1.100 |

TABLE 19-continued

| Surface No. | Component | Radius of Curvature | Thickness/ Distance | Refractive Index | Abbe Number | Effective Radius |
|---|---|---|---|---|---|---|
| S8 | | Infinity | 0.2000 | | | 1.100 |
| S9 | Fourth Lens | 57.1728 | 0.3594 | 1.534 | 55.7 | 1.204 |
| S10 | | −9.2674 | 0.1400 | | | 1.432 |
| S11 | Fifth Lens | 14.2907 | 0.4297 | 1.647 | 21.5 | 1.722 |
| S12 | | 4.1342 | 0.2551 | | | 2.142 |
| S13 | Sixth Lens | 0.9806 | 0.5053 | 1.534 | 55.7 | 2.411 |
| S14 | | 0.8068 | 0.5288 | | | 2.727 |
| S15 | Filter | Infinity | 0.2100 | | | |
| S16 | | Infinity | 0.2062 | | | |
| S17 | Imaging Plane | | −0.0200 | | | |

TABLE 20

| Surface No. | S1 | S2 | S3 | S4 | S9 |
|---|---|---|---|---|---|
| K | −4.2633E−01 | −9.9000E+01 | −9.1381E+01 | 9.2176E+00 | 9.9000E+01 |
| A | −3.6745E−02 | −3.0778E−01 | −2.2035E−01 | −1.1016E−01 | 3.0790E−02 |
| B | −1.5228E+00 | −3.8680E−01 | 1.9114E+00 | 4.1226E+00 | −3.5019E−01 |
| C | 7.6228E+01 | 2.7951E+01 | −4.8364E+01 | −7.1118E+01 | 2.9534E+00 |
| D | −1.5345E+03 | −5.0822E+02 | 8.6952E+02 | 7.9246E+02 | −2.0387E+01 |
| E | 1.8062E+04 | 5.9808E+03 | −9.6208E+03 | −6.0137E+03 | 9.1947E+01 |
| F | −1.3927E+05 | −4.8330E+04 | 6.9947E+04 | 3.2279E+04 | −2.7117E+02 |
| G | 7.4120E+05 | 2.7284E+05 | −3.4980E+05 | −1.2529E+05 | 5.4277E+02 |
| H | −2.7939E+06 | −1.0881E+06 | 1.2337E+06 | 3.5526E+05 | −7.5885E+02 |
| J | 7.5262E+06 | 3.0770E+06 | −3.0968E+06 | −7.3535E+05 | 7.5104E+02 |
| L | −1.4403E+07 | −6.1248E+06 | 5.5026E+06 | 1.0979E+06 | −5.2481E+02 |
| M | 1.9129E+07 | 8.3853E+06 | −6.7651E+06 | −1.1503E+06 | 2.5346E+02 |
| N | −1.6764E+07 | −7.5128E+06 | 5.4748E+06 | 8.0176E+05 | −8.0528E+01 |
| O | 8.7181E+06 | 3.9647E+06 | −2.6240E+06 | −3.3366E+05 | 1.5142E+01 |
| P | −2.0377E+06 | −9.3416E+05 | 5.6434E+05 | 6.2696E+04 | −1.2762E+00 |

| Surface No. | S10 | S11 | S12 | S13 | S14 |
|---|---|---|---|---|---|
| K | −9.9000E+01 | 6.0483E+01 | −7.7735E+00 | −2.5181E+00 | −9.6110E−01 |
| A | 1.8823E−01 | 3.0572E−01 | −3.1859E−01 | −8.0995E−01 | −8.8791E−01 |
| B | 8.2100E−01 | 4.7390E−01 | 2.0074E+00 | 1.6979E+00 | 1.3117E+00 |
| C | −7.9680E+00 | −4.2003E+00 | −5.1940E+00 | −2.7527E+00 | −1.6501E+00 |
| D | 2.7438E+01 | 1.1115E+01 | 8.0246E+00 | 3.2904E+00 | 1.5445E+00 |
| E | −5.7448E+01 | −1.8190E+01 | −8.4315E+00 | −2.9105E+00 | −1.0522E+00 |
| F | 8.3396E+01 | 2.0916E+01 | 6.3581E+00 | 1.8880E+00 | 5.2195E−01 |
| G | −8.9114E+01 | −1.7638E+01 | −3.5309E+00 | −8.9477E−01 | −1.8965E−01 |
| H | 7.2201E+01 | 1.1034E+01 | 1.4587E+00 | 3.0975E−01 | 5.0587E−02 |
| J | −4.4757E+01 | −5.0953E+00 | −4.4748E−01 | −7.8024E−02 | −9.8567E−03 |
| L | 2.1014E+01 | 1.7053E+00 | 1.0052E−01 | 1.4120E−02 | 1.3820E−03 |
| M | −7.2424E+00 | −4.0006E−01 | −1.6052E−02 | −1.7863E−03 | −1.3539E−04 |
| N | 1.7247E+00 | 6.2053E−02 | 1.7232E−03 | 1.4983E−04 | 8.7741E−06 |
| O | −2.5255E−01 | −5.6879E−03 | −1.1136E−04 | −7.4811E−06 | −3.3724E−07 |
| P | 1.7062E−02 | 2.3223E−04 | 3.2689E−06 | 1.6823E−07 | 5.8099E−09 |

Tables 21 and 22 represent optical characteristic values and values of Conditional Expressions, respectively, of the optical imaging systems according to the first to tenth example embodiments.

TABLE 21

| Remark | First Example Embodiment | Second Example Embodiment | Third Example Embodiment | Fourth Example Embodiment | Fifth Example Embodiment |
|---|---|---|---|---|---|
| f1 | 3.0776 | 3.10887 | 3.1498 | 3.2778 | 3.2871 |
| f2 | −8.1108 | −8.3693 | −8.7320 | −10.2143 | −10.3803 |
| f3(fv) | −500~50 | −500~50 | −500~50 | −500~50 | −500~50 |
| f4 | 14.9004 | 14.8820 | 14.9065 | 14.9681 | 14.9577 |
| f5 | −10.2800 | −9.5550 | −9.5691 | −9.5164 | −9.3241 |
| f6 | −128.7626 | 431.9236 | 418.6342 | 1331.4658 | 331.6131 |
| TTL | 4.5600 | 4.5600 | 4.5600 | 4.5600 | 4.5600 |
| f | 3.6070 | 3.6070 | 3.6070 | 3.6070 | 3.6070 |

TABLE 21-continued

| | | | | | |
|---|---|---|---|---|---|
| ImgH | 3.2840 | 3.2840 | 3.2840 | 3.2840 | 3.2840 |
| FOV | 82.9528 | 82.9776 | 82.9720 | 82.9755 | 83.0550 |
| L1S1E | 1.4500 | 1.4500 | 1.4500 | 1.4500 | 1.4500 |
| L3S1E | 1.1000 | 1.1000 | 1.1000 | 1.1000 | 1.1000 |

| Remark | Sixth Example Embodiment | Seventh Example Embodiment | Eighth Example Embodiment | Ninth Example Embodiment | Tenth Example Embodiment |
|---|---|---|---|---|---|
| f1 | 3.1720 | 3.1125 | 3.1357 | 3.1465 | 3.1506 |
| f2 | −8.9835 | −8.4140 | −8.7274 | −8.9671 | −9.1255 |
| f3(fv) | −500~50 | −500~50 | −500~50 | −500~50 | −500~50 |
| f4 | 14.8889 | 14.8717 | 14.8845 | 14.8865 | 14.8896 |
| f5 | −9.1402 | −9.8067 | −9.3276 | −9.0678 | −9.0222 |
| f6 | 167.8589 | −295.3601 | 316.2784 | 246.4371 | 569.8565 |
| TTL | 4.6450 | 4.6000 | 4.5400 | 4.5200 | 4.5000 |
| f | 3.6070 | 3.6070 | 3.6070 | 3.6070 | 3.6070 |
| ImgH | 3.2840 | 3.28404 | 3.2840 | 3.2840 | 3.2840 |
| FOV | 82.7264 | 82.7280 | 83.0455 | 83.1804 | 83.2476 |
| L1S1E | 1.4500 | 1.4500 | 1.4500 | 1.4500 | 1.4500 |
| L3S1ER | 1.1000 | 1.1000 | 1.1000 | 1.1000 | 1.1000 |

TABLE 22

| Conditional Expression | First Example Embodiment | Second Example Embodiment | Third Example Embodiment | Fourth Example Embodiment | Fifth Example Embodiment |
|---|---|---|---|---|---|
| SD/TD | 0.9594 | 0.9594 | 0.9593 | 0.9593 | 0.9592 |
| T1/TTL | 0.1754 | 0.1754 | 0.1754 | 0.1787 | 0.1776 |
| V1 − V2 | 35.6130 | 35.6130 | 36.7520 | 36.7520 | 36.7520 |
| LD/TD | 0.6486 | 0.6484 | 0.6491 | 0.6437 | 0.6455 |
| L1S1E/T1 | 1.8125 | 1.8125 | 1.8125 | 1.7791 | 1.7905 |
| D12/f | 0.0066 | 0.0066 | 0.0066 | 0.0066 | 0.0066 |
| \|f1/f6\| | 0.0239 | 0.0072 | 0.0075 | 0.0025 | 0.0099 |
| L1S1E/T1 | 1.8125 | 1.8125 | 1.8125 | 1.7791 | 1.7905 |
| D12/f | 0.0066 | 0.0066 | 0.0066 | 0.0066 | 0.0066 |
| f2/f4 | −0.5443 | −0.5624 | −0.5858 | −0.6824 | −0.6940 |
| f2/f5 | 0.7890 | 0.8759 | 0.9125 | 1.0733 | 1.1133 |
| (R1 + R2)/(R1 − R2) | −0.9100 | −0.9332 | −0.9665 | −1.0584 | −1.0673 |
| R1/(R9 + R10) | 0.0934 | 0.0941 | 0.0936 | 0.0919 | 0.0916 |
| R1/(R11 + R12) | 0.9611 | 0.9659 | 0.9653 | 0.9691 | 0.9685 |
| (R9 + R10)/(R11 + R12) | 10.2947 | 10.2680 | 10.3142 | 10.5473 | 10.5744 |
| R1/R11 | 1.7350 | 1.7547 | 1.7534 | 1.7602 | 1.7622 |

| Conditional Expression | Sixth Example Embodiment | Seventh Example Embodiment | Eighth Example Embodiment | Ninth Example Embodiment | Tenth Example Embodiment |
|---|---|---|---|---|---|
| SD/TD | 0.9609 | 0.9600 | 0.9587 | 0.9581 | 0.9574 |
| T1/TTL | 0.1722 | 0.1739 | 0.1762 | 0.1770 | 0.1778 |
| V1 − V2 | 35.6130 | 35.6130 | 35.6130 | 35.6130 | 35.6130 |
| LD/TD | 0.6569 | 0.6527 | 0.6455 | 0.6431 | 0.6404 |
| L1S1E/T1 | 1.8125 | 1.8125 | 1.8125 | 1.8125 | 1.8125 |
| D12/f | 0.0066 | 0.0066 | 0.0066 | 0.0066 | 0.0066 |
| \|f1/f6\| | 0.0189 | 0.0105 | 0.0099 | 0.0128 | 0.0055 |
| L1S1E/T1 | 1.8125 | 1.8125 | 1.8125 | 1.8125 | 1.8125 |
| D12/f | 0.0066 | 0.0066 | 0.0066 | 0.0066 | 0.0066 |
| f2/f4 | −0.6034 | −0.5658 | −0.5863 | −0.6024 | −0.6129 |
| f2/f5 | 0.9829 | 0.8580 | 0.9356 | 0.9889 | 1.0114 |
| (R1 + R2)/(R1 − R2) | −0.9521 | −0.9272 | −0.9748 | −1.0038 | −1.0288 |
| R1/(R9 + R10) | 0.0967 | 0.0945 | 0.0931 | 0.0929 | 0.0922 |
| R1/(R11 + R12) | 0.9680 | 0.9641 | 0.9625 | 0.9568 | 0.9506 |
| (R9 + R10)/(R11 + R12) | 10.0055 | 10.2019 | 10.3421 | 10.3001 | 10.3082 |
| R1/R11 | 1.7597 | 1.7433 | 1.7525 | 1.7449 | 1.7327 |

Figure 21:
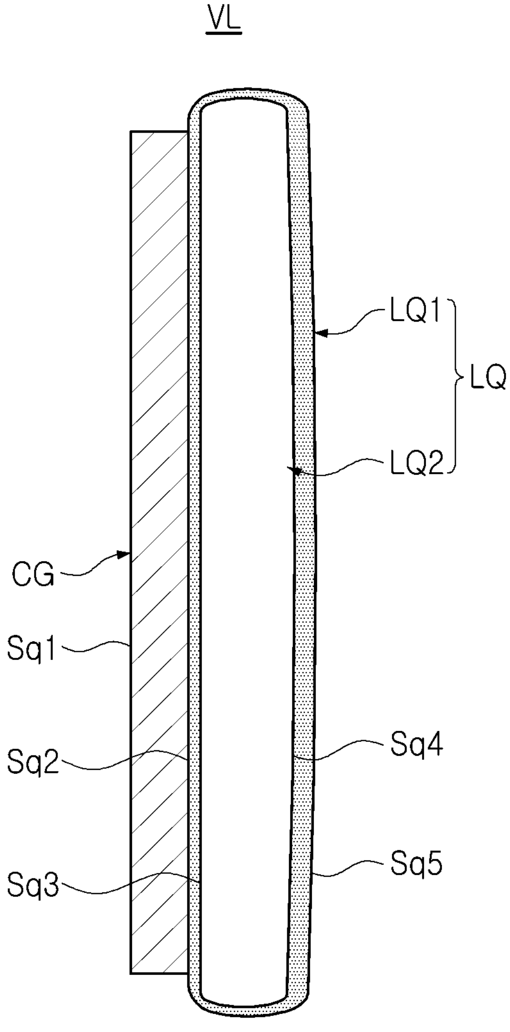
FIG. 21 is a view illustrating one form of a variable focus lens.

Next, a configuration of the variable focus lens will be described with reference to FIG. 21.

The variable focus lens VL according to one form may be configured to have a predetermined refractive power. For example, the variable focus lens VL may have positive refractive power. One surface of the variable focus lens VL may be convex. For example, as illustrated in FIG. 21, image-side portions Sq4 and Sq5 of the variable focus lens VL may be convex. One surface of the variable focus lens VL may be flat. For example, as illustrated in FIG. 21, an object-side surface Sq3 of the variable focus lens VL may be flat. However, one surface of the variable focus lens VL is not necessarily flat. A radius of curvature of a convex surface or the image side portions Sq4 and Sq5 of variable focus lens VL may be changeable. For example, a volume or a shape of the variable focus lens VL may be changed by externally supplied energy to change the radius of curvature of the image side portions Sq4 and Sq5. A cover glass CG may be disposed on one surface of the variable focus lens VL. The cover glass CG may be disposed in close contact with one surface of the variable focus lens VL to keep one surface of the variable focus lens VL always flat (a radius of curvature of one surface of the variable focus lens VL is a value close to infinity). In detail, radii of curvature of a first surface Sq1 and a second surface Sq2 of the cover glass CG may be values approximately close to infinity.

The variable focus lens VL may include a plurality of members. For example, the variable focus lens VL may include a first member LQ1 and a second member LQ2. The first member LQ1 may be configured to surround surfaces of the second member LQ2. For example, the first member LQ1 may be configured to cover an object-side surface and an image-side surface of the second member LQ2. The first member LQ1 and the second member LQ2 may be configured to have different refractive indices and Abbe numbers. For example, a refractive index of the second member LQ2 may be greater than that of the first member LQ1, and an Abbe number of the second member LQ2 may be lower than that of the first member LQ1. The second member LQ2 may be made of a material that is easily deformable. For example, the second member LQ2 may be deformed to have a size that is the same as or similar to that of the first member LQ1. In detail, image-side surfaces Sq4 and Sq5 of the second member LQ2 may be deformed to have the same size as a radius of curvature of an image-side surface Sq4 of the first member LQ1.

Figure 22:
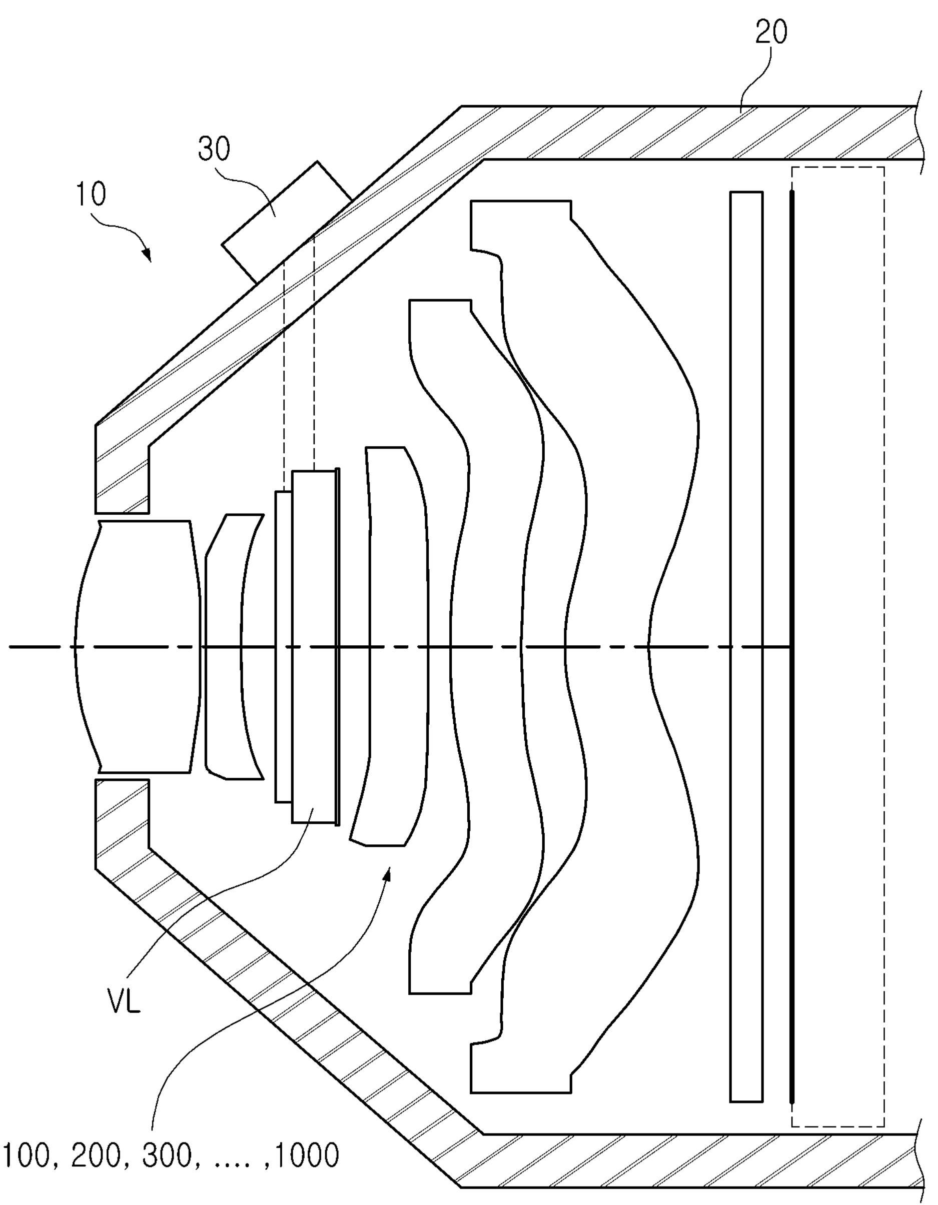
FIG. 22 is a view illustrating a camera module according to an example embodiment.

Next, a camera module including an optical imaging system according to an example embodiment will be described with reference to FIG. 22.

The camera module 10 according to the example embodiment may include a barrel 20 and an optical imaging system. The optical imaging system may be any one of the optical imaging systems 100, 200, 300, 400, 500, 600, 700, 800, 900, and 1000 according to the above-described example embodiments. The camera module 10 may include a component for supplying energy to the variable focus lens VL. For example, the camera module 10 may include a device 30 for supplying a current to the variable focus lens VL. The device 30 may be configured to supply energy directly or indirectly to the variable focus lens VL. As an example, the device 30 may be configured to directly generate thermal energy or vibration energy. As another example, the device 30 may be in the form of a connection terminal configured to transfer external power to the variable focus lens VL. The device 30 may be configured to be disposed outside the barrel 20 or in an empty space between the barrel 20 and any one of the optical imaging systems 100, 200, 300, 400, 500, 600, 700, 800, 900, and 1000.

The camera module 10 may be configured so that autofocusing (AF) is possible. For example, the camera module 10 may perform the autofocusing by supplying energy to the variable focus lens VL included in any one of the optical imaging systems 100, 200, 300, 400, 500, 600, 700, 800, 900, and 1000. Therefore, in the camera module 10 according to the present example embodiment, a driving device for driving any one of the optical imaging systems 100, 200, 300, 400, 500, 600, 700, 800, 900, and 1000 in an optical axis direction may be omitted, and a focal length may be precisely adjusted through the variable focus lens VL.

The optical imaging system according to an example embodiment in the present disclosure may adjust a focal length to enable miniaturization and weight reduction of the camera module.

In addition, since the camera module including the optical imaging system according to an example embodiment in the present disclosure may be autofocused by changing a shape of the variable focus lens, a focus of the camera module may be rapidly adjusted, and a driving current required for the autofocusing of the camera module may be reduced.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens having positive refractive power, a second lens having negative refractive power, a third lens, a fourth lens having positive refractive power, a fifth lens having negative refractive power, and a sixth lens sequentially arranged from an object side toward an imaging plane, wherein an image-side surface of the fifth lens is concave in a paraxial region, wherein an object-side surface of the sixth lens is convex in a paraxial region, and wherein the third lens is a variable focus lens configured to have a variable focal length.

2. The optical imaging system of claim 1, wherein an image-side surface of the first lens is convex in a paraxial region.

3. The optical imaging system of claim 1, wherein an image-side surface of the second lens is concave in a paraxial region.

4. The optical imaging system of claim 1, wherein an image-side surface of the fourth lens is convex in a paraxial region.

5. The optical imaging system of claim 1, wherein an object-side surface of the fifth lens is convex in a paraxial region.

6. The optical imaging system of claim 1, wherein an image-side surface of the sixth lens is concave in a paraxial region.

7. The optical imaging system of claim 1, wherein $0.8<SD/TD$ in which SD is a distance from a stop to an image-side surface of the sixth lens, and TD is a distance from an object-side surface of the first lens to the image-side surface of the sixth lens.

8. The optical imaging system of claim 1, wherein $0.07<T1/TTL<0.20$ in which T1 is a thickness of the first lens, and TTL is a distance from an object-side surface of the first lens to the imaging plane.

9. The optical imaging system of claim 1, wherein $25<V1-V2<45$ in which V1 is an Abbe number of the first lens, and V2 is an Abbe number of the second lens.

10. The optical imaging system of claim 1, wherein $0.5<LD/TD$ in which LD is a distance from an object-side surface of a variable focus lens to an image-side surface of a sixth lens, and TD is a distance from an object-side surface of the first lens to an image-side surface of the sixth lens.

11. The optical imaging system of claim 1, wherein $-500\ mm<fv<50.0\ mm$ in which fv is a focal length of the variable focus lens.

12. The optical imaging system of claim 1, wherein $L1S1E/T1<2.0$ in which L1S1E is an effective diameter of an object-side surface of the first lens, and T1 is a thickness of the first lens.

13. The optical imaging system of claim 1, wherein $D12/f<0.2$ in which D12 is a distance from an image-side surface of the first lens to an object-side surface of the second lens, and f is a focal length of the optical imaging system.

14. The optical imaging system of claim 1, wherein $L3S1ER<1.5\ mm$ in which L3S1ER is an effective radius of an object-side surface of the third lens.

15. An electronic device comprising:
a camera module comprising the optical imaging system of claim 1,
wherein the optical imaging system further comprises an image sensor having a surface on which the imaging plane is formed.

16. An optical imaging system comprising:
a first lens having positive refractive power;
a second lens having negative refractive power;
a third lens having refractive power;
a fourth lens having positive refractive power and having a convex object-side surface in a paraxial region and a convex image-side surface in a paraxial region;
a fifth lens having negative refractive power, having a convex object-side surface in a paraxial region, and having a concave image-side surface in a paraxial region; and
a sixth lens having refractive power,
wherein the first lens to the sixth lens are sequentially arranged from an object-side surface,
wherein the third lens is a variable lens configured to have a variable focal length, and
wherein $0.001<f1/f6<0.026$ in which f1 is a focal length of the first lens, and f6 is a focal length of the sixth lens.

17. An electronic device comprising:
a camera module comprising the optical imaging system of claim 16,
wherein the optical imaging system further comprises an image sensor having a surface on which an imaging plane of the optical imaging system is formed.

18. An optical imaging system comprising:
a first lens having positive refractive power, a second lens having negative refractive power, a third lens, a fourth lens having positive refractive power, a fifth lens having negative refractive power, and a sixth lens sequentially arranged from an object side toward an imaging plane,
wherein an image-side surface of the fifth lens is concave in a paraxial region,
wherein the third lens is a variable focus lens configured to have a variable focal length, and
wherein $0.07<T1/TTL<0.20$ in which T1 is a thickness of the first lens, TTL is a distance from an object-side surface of the first lens to the imaging plane.

19. An electronic device comprising:
a camera module comprising the optical imaging system of claim 18,
wherein the optical imaging system further comprises an image sensor having a surface on which the imaging plane is formed.

* * * * *